United States Patent [19]
Ozawa

[11] Patent Number: 5,956,669
[45] Date of Patent: Sep. 21, 1999

[54] IMAGE FORMING APPARATUS WITH TRANSLATION CAPABILITY

[75] Inventor: Toshirou Ozawa, Kawasaki, Japan

[73] Assignee: Ricoh Company, Ltd., Tokyo, Japan

[21] Appl. No.: 08/848,275

[22] Filed: Apr. 29, 1997

Related U.S. Application Data

[63] Continuation of application No. 08/296,232, Aug. 25, 1994, abandoned.

[30] Foreign Application Priority Data

Aug. 27, 1993 [JP] Japan ................................ 5-235545

[51] Int. Cl.[6] ..................................................... G06F 17/20
[52] U.S. Cl. ..................................................... 704/5; 704/4
[58] Field of Search ................................ 704/1–3, 4–10; 707/1, 10, 200, 536, 540

[56] References Cited

U.S. PATENT DOCUMENTS

| 4,890,230 | 12/1989 | Tanoshima | 704/3 |
|---|---|---|---|
| 4,916,614 | 4/1990 | Kaji et al. | 704/2 |
| 5,062,047 | 10/1991 | Tanaka et al. | 704/3 |
| 5,140,522 | 8/1992 | Ito et al. | 704/2 |
| 5,349,368 | 9/1994 | Takeda et al. | 704/3 |
| 5,497,319 | 3/1996 | Chong et al. | 704/3 |
| 5,517,409 | 5/1996 | Ozawa et al. | 704/3 |
| 5,701,497 | 12/1997 | Yamauchi et al. | 704/3 |
| 5,765,179 | 6/1998 | Sumita et al. | |

*Primary Examiner*—Frantzy Poinvil
*Attorney, Agent, or Firm*—Oblon, Spivak, McClelland, Maier & Neustadt, P.C.

[57] ABSTRACT

In an image forming apparatus with a translation capability, equivalents data include data each designating a particular field of terminology. When a command designating a field of terminology given priority is entered on an operation board, words existing in the document image are recognized. Among equivalents matching the recognized words, equivalents belonging to the designated field of terminology are output prior to the others. The apparatus allows a person with some reading knowledge of a foreign language to read not only ordinary documents written in the foreign language but also writings belonging to a particular or special field.

4 Claims, 30 Drawing Sheets

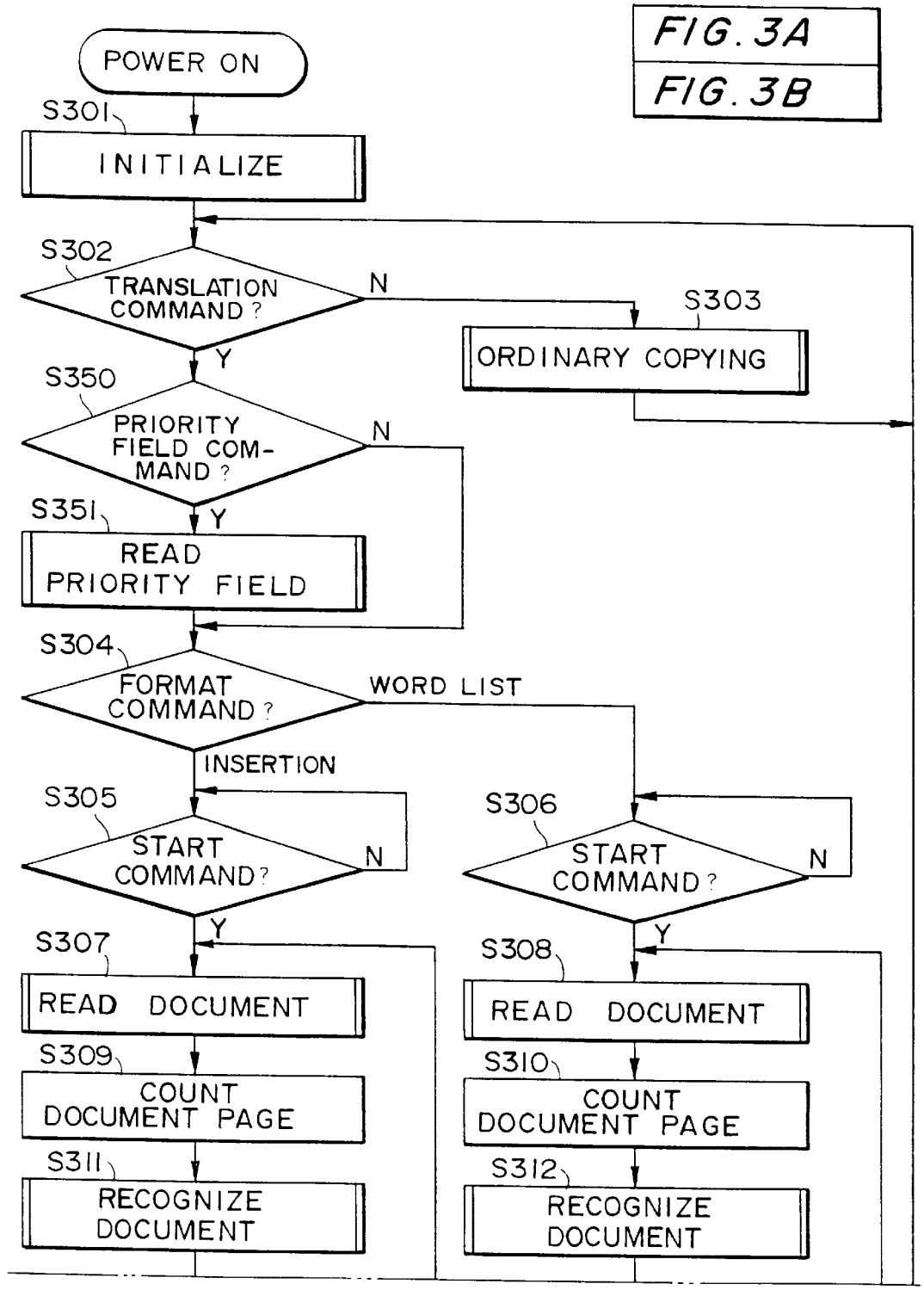

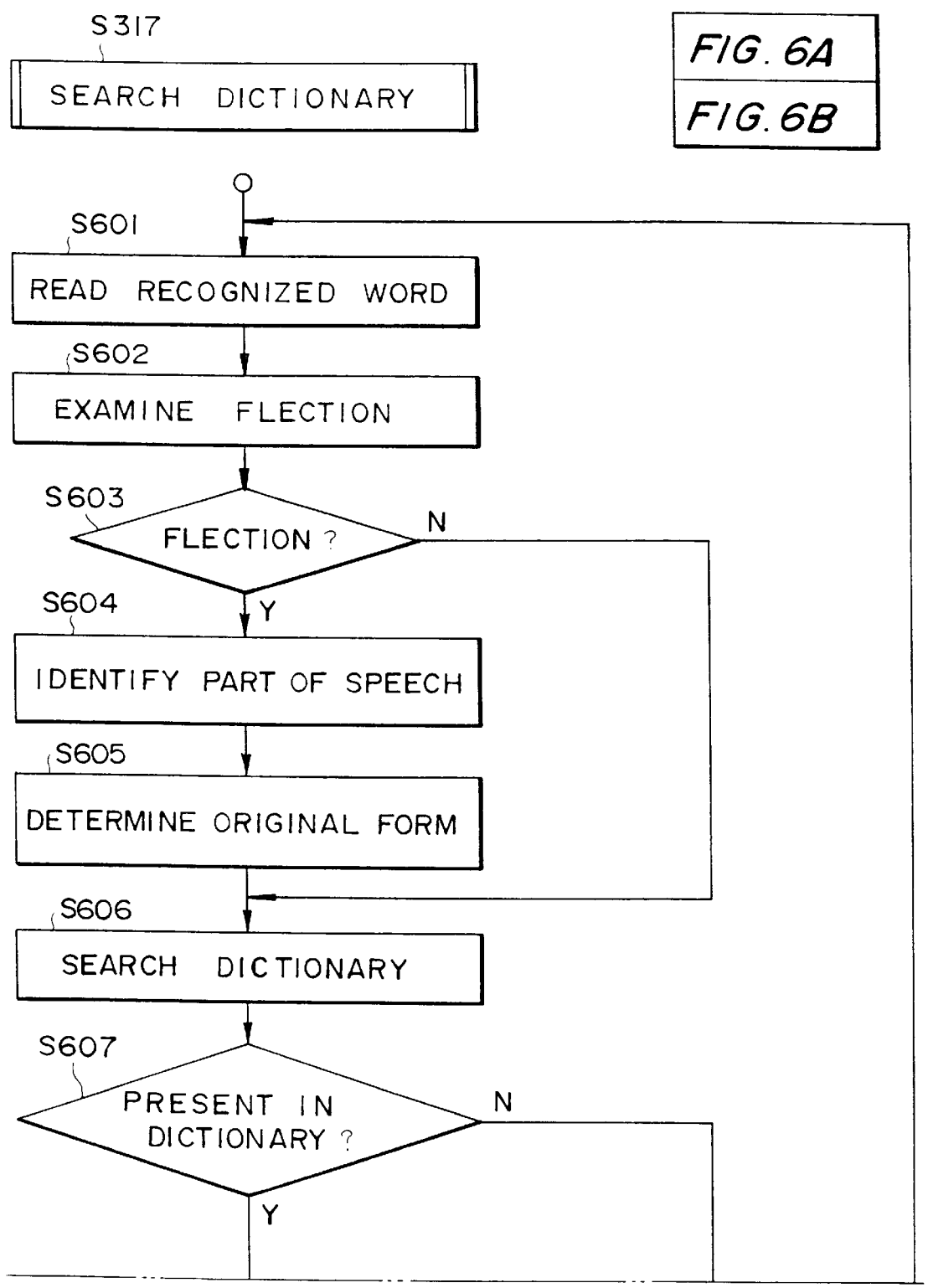

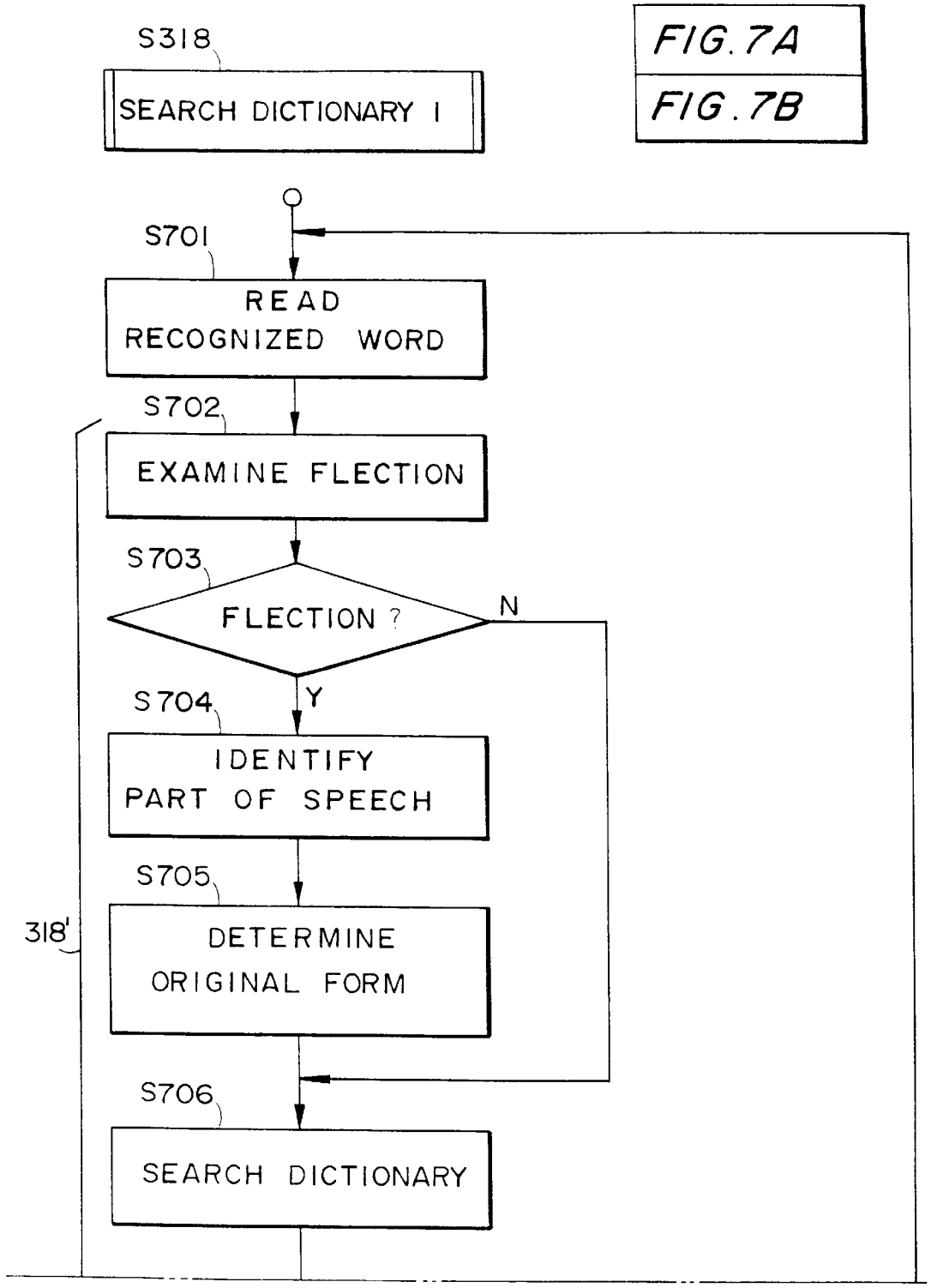

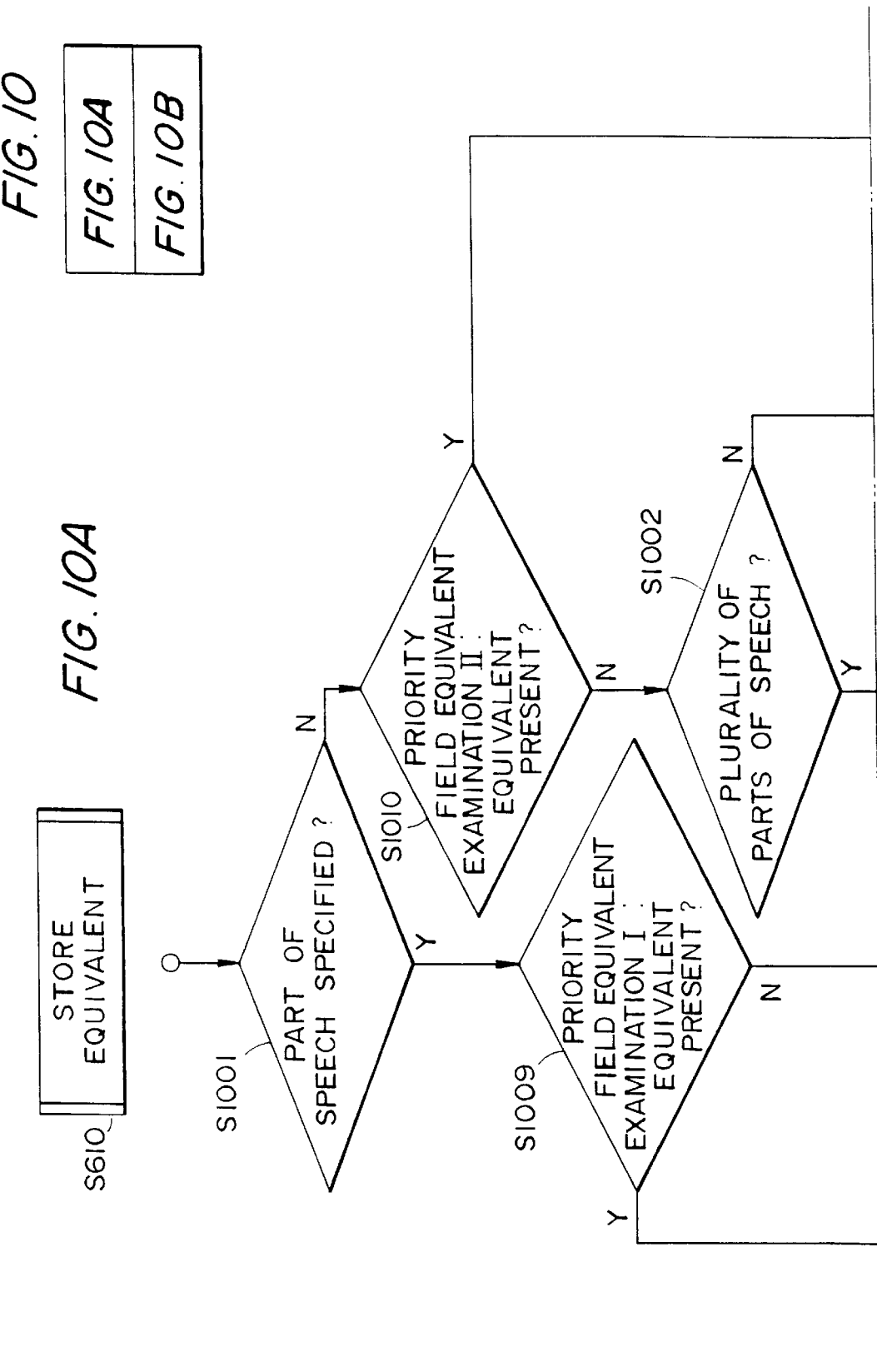

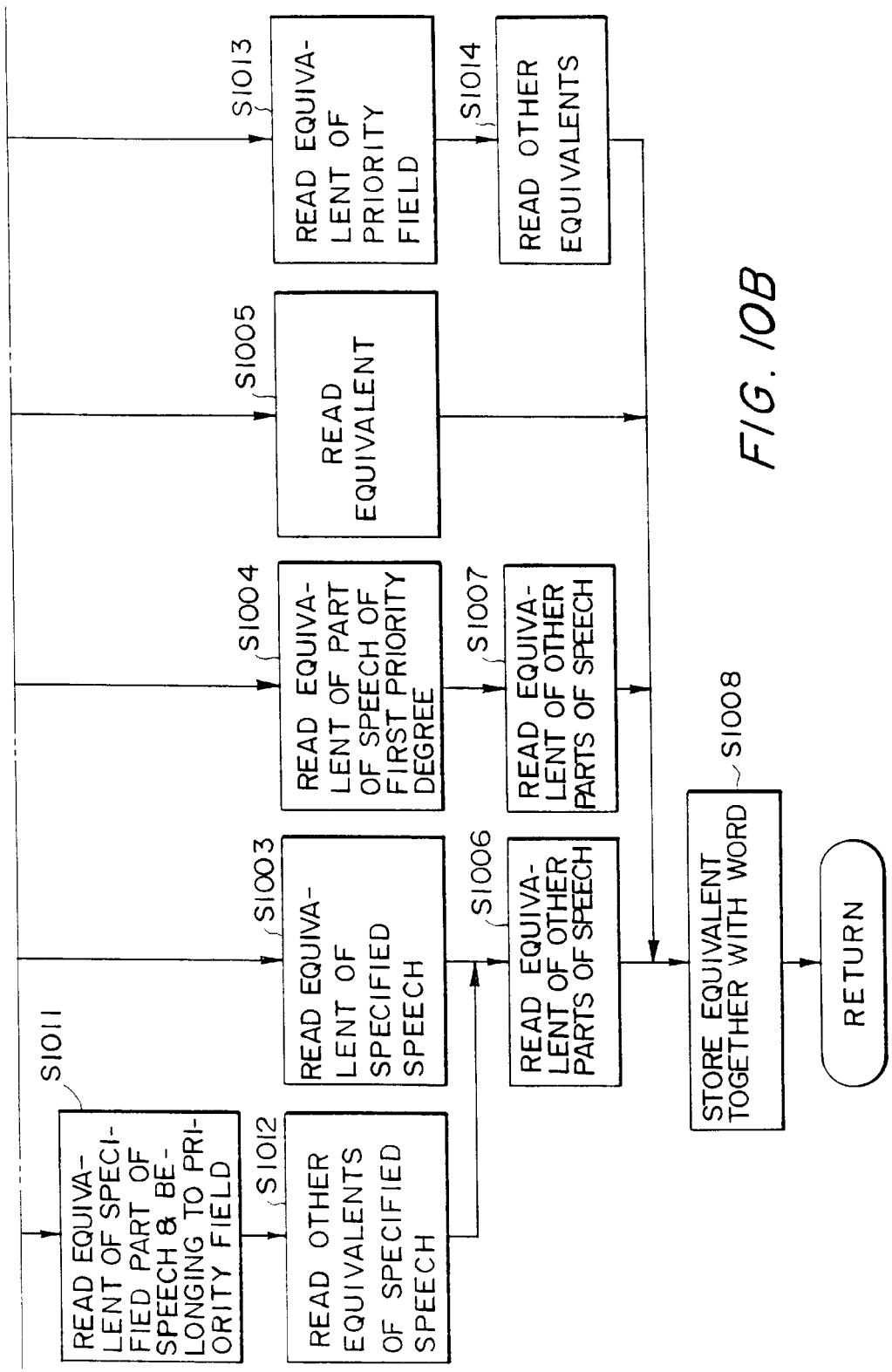

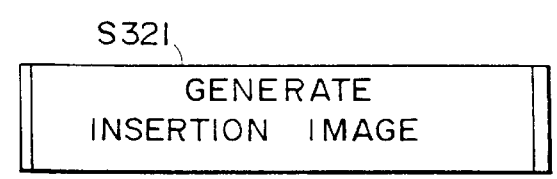
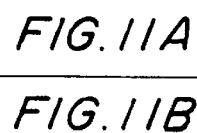
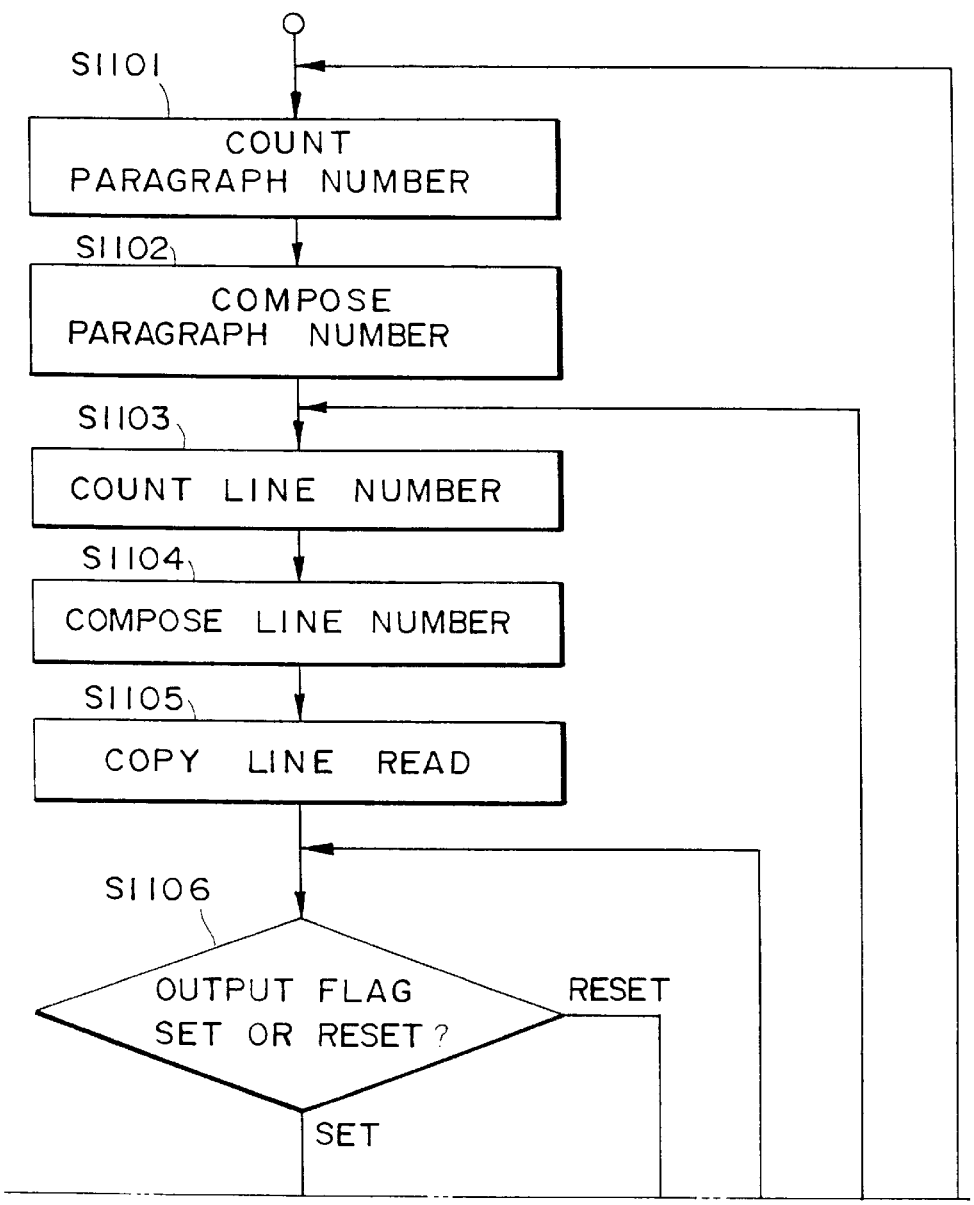

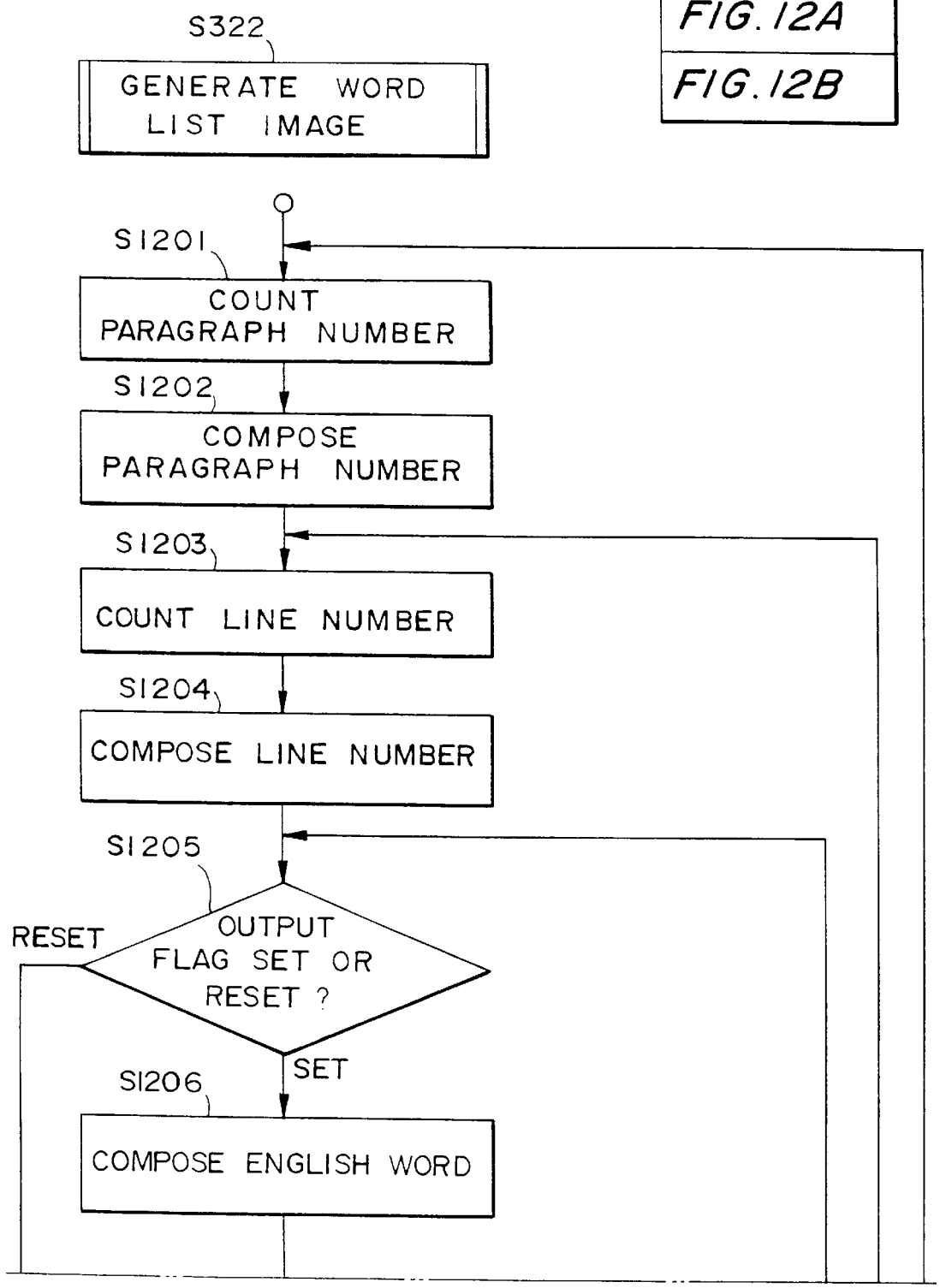

| 1 | Chapter | (名) (書物の) 章;部門; (人生・史上の) 一期; (事件などの) 一続き(of) |
|---|---|---|
| 2 | hierarchy | (名) (一般に) 階級制度 [制度];階層;教権制度; [神] 天使の階級<br>意味が数行にわたる場合もあるでしょうね・・・・・1 |
|   | includes | (動) (中に) 含む、含める、入れる |
|   | data | (名) 資料、論拠, データ; [数] 既知数 |
|   | item | (名) 個条、条項、種目、項目、細目; (新聞記事の) 一項 |
|   | derived | (動) (…から) 引き出す、得る(from) ;推論する;由来する(from) |
| 3 | single | (形) 唯一 [一人] の、たった一つ [一人] も;単一の、単独の;独身の;一対一の |
|   | abstract | (形) 抽象 [観念] 的な;理想 [観念] 的な;難解な;[美] 抽象派の; (名) 抽象的 |
|   | base | (名) 基底、ふもと、基礎, 根拠地, 基地;出発点; [野球] 塁; [化] 塩基 |
| 4 | hierarchy | (名) (一般に) 階級制度 [制度];階層;教権制度; [神] 天使の階級<br>意味が数行にわたる場合もあるでしょうね・・・・・1 |
|   | includes | (動) (中に) 含む、含める、入れる |
|   | data | (名) 資料、論拠, データ; [数] 既知数 |
|   | item | (名) 個条、条項、種目、項目、細目; (新聞記事の) 一項 |
|   | derived | (動) (…から) 引き出す、得る(from) ;推論する;由来する(from) |
| 5 | single | (形) 唯一 [一人] の、たった一つ [一人] も;単一の、単独の;独身の;一対一の |
|   | abstract | (形) 抽象 [観念] 的な;理想 [観念] 的な;難解な;[美] 抽象派の; (名) 抽象的 |
|   | base | (名) 基底、ふもと、基礎, 根拠地, 基地;出発点; [野球] 塁; [化] 塩基 |
| 6 | hierarchy | (名) (一般に) 階級制度 [制度];階層;教権制度; [神] 天使の階級<br>意味が数行にわたる場合もあるでしょうね・・・・・1 |
|   | includes | (動) (中に) 含む、含める、入れる |
|   | data | (名) 資料、論拠, データ; [数] 既知数 |
|   | item | (名) 個条、条項、種目、項目、細目; (新聞記事の) 一項 |
|   | derived | (動) (…から) 引き出す、得る(from) ;推論する;由来する(from) |
| 7 | single | (形) 唯一 [一人] の、たった一つ [一人] も;単一の、単独の;独身の;一対一の |
|   | abstract | (形) 抽象 [観念] 的な;理想 [観念] 的な;難解な;[美] 抽象派の; (名) 抽象的 |
|   | base | (名) 基底、ふもと、基礎, 根拠地, 基地;出発点; [野球] 塁; [化] 塩基 |
| 8 | hierarchy | (名) (一般に) 階級制度 [制度];階層;教権制度; [神] 天使の階級<br>意味が数行にわたる場合もあるでしょうね・・・・・1 |
|   | includes | (動) (中に) 含む、含める、入れる |
|   | data | (名) 資料、論拠, データ; [数] 既知数 |
|   | item | (名) 個条、条項、種目、項目、細目; (新聞記事の) 一項 |
|   | derived | (動) (…から) 引き出す、得る(from) ;推論する;由来する(from) |
| 9 | single | (形) 唯一 [一人] の、たった一つ [一人] も;単一の、単独の;独身の;一対一の |
|   | abstract | (形) 抽象 [観念] 的な;理想 [観念] 的な;難解な;[美] 抽象派の; (名) 抽象的 |
|   | base | (名) 基底、ふもと、基礎, 根拠地, 基地;出発点; [野球] 塁; [化] 塩基 |

FIG. 15

This is a title

An object-based hierarchy includes data items derived from a single abstract base class.

Chapter 1

An object-based hierarchy includes data items derived from a single abstract base class.
An object-based hierarchy includes data items derived from a single abstract base class.
An object-based hierarchy includes data items derived from a single abstract base class.

Chapter 2

An object-based hierarchy includes data items derived from a single abstract base class.
An object-based hierarchy includes data items derived from a single abstract base class.
An object-based hierarchy includes data items derived from a single abstract base class.
An object-based hierarchy includes data items derived from a single abstract base class.

Chapter 3

An object-based hierarchy includes data items derived from a single abstract base class.
An object-based hierarchy includes data items derived from a single abstract base class.

AAAAAAAA1

FIG. 17

1 This is a title

2 An object-based hierarchy includes data items derived from a single abstract base class.

3 hapter 1

An object-based hierarchy includes data items derived from a single abstract base class.
An object-based hierarchy includes data items derived from 5 ingle abstract base class.
An object-based hierarchy includes data items derived from a single abstract base class.

4 hapter 2

An object-based hierarchy includes data items derived from a single abstract base class.
An object-based hierarchy includes data items derived from 5 ingle abstract base class.
An object-based hierarchy includes data items derived from a single abstract base class.
An object-based hierarchy includes data items derived from a single abstract base class.

5 hapter 3

An object-based hierarchy includes data items derived from a single abstract base class.
An object-based hierarchy includes data items derived from 5 ingle abstract base class.

6 AAAAAA1

FIG. 18

1 This is a title
これ 題目
表題

2 An object-based hierarchy includes data items derived
階級制度 含む 資料 項目 推論する
情報
from a single abstract base class.
唯一の 抽象的な 基礎
ぼんやりした 根拠

3 Chapter 1
章
An object-based hierarchy includes data items derived from
階級制度 含む 資料 項目 推論する
情報
a single abstract base class.
唯一の 抽象的な 基礎
ぼんやりした 根拠
An object-based hierarchy includes data items derived from
階級制度 含む 資料 項目 推論する
情報
5 a single abstract base class.
唯一の 抽象的な 基礎
ぼんやりした 根拠
An object-based hierarchy includes data items derived from
階級制度 含む 資料 項目 推論する
情報
a single abstract base class.
唯一の 抽象的な 基礎
ぼんやりした 根拠

An object-based hierarchy includes data items derived from
階級制度 含む 資料 項目 推論する
情報
a single abstract base class.
唯一の 抽象的な 基礎
ぼんやりした 根拠
An object-based hierarchy includes data items derived from
階級制度 含む 資料 項目 推論する
情報
5 a single abstract base class.
唯一の 抽象的な 基礎
ぼんやりした 根拠

6 A A A A A A A A A !
ああああ

4 Chapter 2
章
An object-based hierarchy includes data items derived from
階級制度 含む 資料 項目 推論する
情報
a single abstract base class.
唯一の 抽象的な 基礎
ぼんやりした 根拠
An object-based hierarchy includes data items derived from
階級制度 含む 資料 項目 推論する
情報
5 a single abstract base class.
唯一の 抽象的な 基礎
ぼんやりした 根拠
An object-based hierarchy includes data items derived from
階級制度 含む 資料 項目 推論する
情報
a single abstract base class.
唯一の 抽象的な 基礎
ぼんやりした 根拠
An object-based hierarchy includes data items derived from
階級制度 含む 資料 項目 推論する
情報
a single abstract base class.
唯一の 抽象的な 基礎
ぼんやりした 根拠

5 Chapter 3
章

FIG. 19

| 分野名の略形一覧表 | |
|---|---|
| <医> | 医学, 精神医学, 病気, 医療 |
| <印> | 印刷, 製本 |
| <宇宙> | 宇宙関係, 地球物理 |
| <映> | 映画 |
| <音> | 音声学 |
| <化> | 化学 |
| <海> | 海事, 航海 |
| <貝> | 貝類 |
| <解> | 解剖 (解剖学および内蔵など身体内部にある器官の |
| <楽> | 音楽 (洋楽, 邦楽, 楽器) |
| <株> | 株式 |
| <機> | 機械 |
| <気> | 気象学 |
| <魚> | 魚類 |
| <通> | 通信 (機器) |
| <哲> | 哲学 |
| <鉄鋼> | 鉄鋼業, 冶金, 鍛冶や |
| <鉄道> | |
| <天> | 天文学 |
| <電> | 電気 (テレビ・ラジオ) |
| <電算> | コンピュータ, 電子工学 |
| <動> | 動物 (ほ乳類) |
| <土・測> | 土木, 測量 |
| <農> | 農業 |
| <美> | 美術 (絵画, 周刻, 陶芸) |
| <服飾> | 織物, 服飾, 染物 |
| <文法> | |
| <文学> | 小説, 詩, 評論, 戯曲 |
| <保> | 保健 |
| <法> | 法律, 国際法 |
| <貿> | 貿易 |
| <マス> | マスコミ (マスメディア, テレ |
| <薬> | 薬学, 薬剤 |
| <理> | 物理学, 物理化学 |
| <料理> | 料理 |

FIG. 20

XXXX is a process control supervisor that includes a graphic editor for objects and pictures, a link between application variables and active objects (logical or analogical variables), and fully automatic animation of assigned variable, allowing direct action from operator through a keyboard or mouse.

FIG. 21

| | |
|---|---|
| process | [名] 過程；作用；手順；方法 [動] （フィルムを）現像する；（食品を）加工処理する；＜電算＞（データを）処理する |
| supervisor | [名] 監督者；＜電算＞スーパーバイザ（OSを構成するソフトウェアのうち、その中核部分として機能するモジュールを指す。） |
| graphic | [形] 写実的な；画面（図表）の；文字（記号）の |
| editor | [名] 編集者；＜電算＞編集子；編集プログラム |
| link | [名] （鎖の）輪；連結；リンク [動] つなぐ |
| application | [名] 適用；適応性；申請（書）；（物を）当てること；（熱を）加えること；膏薬；塗り薬；申し込み；志願 |
| variable | [形] 変わりやすいもの；気まぐれ；可変の [名] 変動する（変わりやすい）もの；＜数＞変数 |
| logical | [形] 論理的な；論理学（上）の |
| analogical | [形] 類推的な |
| fully | [副] 充分に |
| automatic | [形] （機械が）自動（式）の；習慣的な；機械的な [名] 自動機械 |
| animation | [名] 生気；アニメーション（動画） |
| assign | [動] 任務につかせる；割り当てる；＜法＞譲渡する；帰する |
| allow | [動] 許す；～させておく；余地がある |
| keyboard | [名] （ピアノ・タイプライターなどの）鍵盤；キーボード |

FIG. 22

XXXX is a process control supervisor that includes a
　　　　　　　　　　　　　　　　　監督者
graphic editor for objects and pictures, a link between
写実的な　編集者　　　　　　　　　　　　　　　輪
application variables and active objects (logical or
適用　　　　　　変動するもの　　　　　　　論理的な
analogical variables), and fully automatic animation of
類推的な　　　　　　　　　　自動式の　　　　　　　生気
5   assigned variable, allowing direct action from operator
任務につかせる　　許す
through a keyboard or mouse.
　　　　　　　　　鍵盤

FIG. 23

| # | English | Japanese |
|---|---------|----------|
| 1 | process | [名] 過程;作用;手順;方法 [動](フィルムを)現像する;(食品を)加工処理する;<電算>(データを)処理する |
|   | supervisor | [名] 監督者;<電算>スーパーバイザ(OSを構成するソフトウエアのうち、その中核部分として機能するモジュールを指す。) |
| 2 | graphic | [形] 写実的な;画面(図表)の;文字(記号)の |
|   | editor | [名] 編集者;<電算>編集子;編集プログラム |
|   | link | [名] (鎖の)輪;連結;リンク [動] つなぐ |
| 3 | application | [名] 適用;適応性;申請(書);(物を)当てること;(熱を)加えること;青葉;塗り薬;申し込み;志願 |
|   | variable | [形] 変動する(変わりやすい)もの;気まぐれ;可変のもの |
|   | logical | [形] 論理的な;論理学(上)の |
| 4 | analogical | [形] 類推的な |
|   | fully | [副] 充分に |
|   | automatic | [形] (機械が)自動(式)の;習慣的な;機械的な;自動機械 |
|   | animation | [名] 生気;アニメーション(動画) |
| 5 | assign | [動] 任務につかせる;割り当てる;<法>譲渡する;帰する |
|   | allow | [動] 許す;~させておく;余地がある |
| 6 | keyboard | [名] (ピアノ・タイプライターなどの)鍵盤;キーボード |

FIG. 24

XXXX is a process control supervisor that includes a
　　　　　　　　過程　　　　　　スーパーバイザ graphic editor for objects and pictures, a link between
写実的な　編集子　　　　　　　　　　　　　　　　輪 application variables and active objects (logical or
適用　　　変動するもの　　　　　　　　　　　論理的な analogical variables), and fully automatic animation of
類推的な　　　　　　　　　　　自動式の　　生気

5 assigned variable, allowing direct action from operator
任務につかせる　　許す through a keyboard or mouse.
　　　　　鍵盤

| | | | |
|---|---|---|---|
| 1 | process | [名] | 過程;作用;手順;方法 [動] (フィルムを) 現像する; (食品を) 加工処理する;<電算> (データを) 処理する |
| | supervisor | | <電算>スーパーバイザ(OSを構成するソフトウェアのうち、その中核部分として機能するモジュールを指す。) [名] 監督者 |
| 2 | graphic | [形] | 写実的な;画面(図表)の;文字(記号)の |
| | editor | | <電算>編集者;編集プログラム [名] 編集者 |
| | link | [名] | (鎖の)輪;連結 [動] 連結する;リンク つなぐ |
| 3 | application | [名] | 適用;申請(書);申し込み;志願 えること;青菜;塗り薬 |
| | variable | [名] | 変動する(変わりやすい)もの;<数>変数 [形] 変わりやすいもの;気まぐれ;可変の |
| | logical | [形] | 論理的な;論理学(上)の |
| 4 | analogical | [形] | 類推的な |
| | fully | [副] | 充分に |
| | automatic | [形] | (機械が)自動(式)の;習慣的な;機械的な [名] 自動機械 |
| | animation | [名] | 生気;アニメーション(動画) |
| 5 | assign | [動] | 任務につかせる;割り当てる;<法>譲渡する;帰する |
| | allow | [動] | 許す;〜させておく;余地がある |
| 6 | keyboard | [名] | (ピアノ・タイプライターなどの)鍵盤;キーボード |

IMAGE FORMING APPARATUS WITH TRANSLATION CAPABILITY

This is a continuation of application Ser. No. 08/296,232, filed on Aug. 25, 1994 now abandoned.

BACKGROUND OF THE INVENTION

The present invention relates to a copier, facsimile apparatus or similar image forming apparatus having a translation capability and, more particularly, to an image forming apparatus capable of optically reading a document (or receiving image data over a communication channel), recognizing words included in the image data read or received, and outputting equivalents for the words to thereby generate a word list.

Even a person having a good knowledge of certain foreign language is often prevented from reading the whole writing written in that language due to only some words belonging to a particular or special field and whose equivalents are not known. Then, the person has to look up a dictionary to see the meanings of the unknown words.

In light of the above, a copier capable of translating a writing written in a foreign language and outputting the translation thereof automatically has been proposed, as taught in Japanese Patent Laid-Open Publication No. 62-154845 by way of example. This kind of copier has image reading means for reading a document image, discriminating means for discriminating graphic data and text data included in the image read, translating means for recognizing the text data character by character and translating the contents into the mother tongue. The resulting translation image is output together with the original image. The translation image associated with the text data makes it needless for a person to look up a dictionary.

However, the conventional copier with a translation capability is redundant and not always functional for persons having a certain knowledge of a foreign language, considering the state-of-the-art translation technologies, which are not entirely free from errors, and costs for implementing such a copier. To eliminate this problem, it has been customary to add equivalents to words present in an original image or to collect the words and their equivalents in a word list. With any one of these improved schemes, persons with some reading knowledge of a foreign language are provided with sufficient information and can read writings written in the foreign language efficiently and rapidly.

Although the improved schemes stated above may be desirable for ordinary documents written in a foreign language, they have some issues yet to be solved when it comes to writings belonging to a particular or special field. It is a common practice with a dictionary containing equivalents for words of foreign language to arrange equivalents of frequent use first; equivalents belonging to particular or special fields appear after the equivalents of frequent use. A word list having equivalents arranged in such an order makes it awkward to read a writing belonging to a particular or special field. Particularly, for a person having a good knowledge of a foreign language and familiar with the ordinary meanings and equivalents of words, but knowing little of words belonging to particular arts, the conventional schemes are undesirable from the efficiency standpoint.

SUMMARY OF THE INVENTION

It is, therefore, an object of the present invention to provide an image forming apparatus with a translation capability which allows a person with a certain knowledge of a foreign language to read not only ordinary documents written in that language but also writings belonging to a particular or special field efficiently.

An image forming apparatus having a translation capability of the present invention comprises an image reading section for optically reading a document image to thereby generate corresponding image data, an image storing section for storing the image data generated by the image reading section or image data received over a communication channel, an image processing section for executing various kinds of image processing with the image data, an image recording section for recording an image on a recording medium in accordance with an image signal output by the image processing section, an equivalents storing section for storing the document image data and equivalents data respectively matching the document image data, and a control section for executing translation with the document image data on the basis of the document image data and the equivalents data stored in the equivalent storing section. The equivalents data stored in the equivalents storing section include data each designating a particular field of terminology. The control section recognizes, when a command designating a field of terminology given priority is entered, words existing in the document image and outputs, among equivalents matching the words, equivalents belonging to the field of terminology prior to the other equivalents.

BRIEF DESCRIPTION OF THE DRAWINGS

The above and other objects, features and advantages of the present invention will become more apparent from the following detailed description taken with the accompanying drawings in which:

FIG. 10 is a flowchart representative of an equivalents storing procedure (word list) included in FIG. 7;

FIG. 14 shows a specific word list output by the embodiment;

FIG. 15 shows a specific document;

FIG. 17 is a view identical with FIG. 15 except for the addition of paragraph numbers;

FIG. 18 shows a specific reproduction which the embodiment outputs by processing the document image of FIG. 15;

FIG. 19 shows a specific list listing various fields of terminology;

FIG. 20 shows a specific document written in English;

FIG. 21 shows specific index words and their equivalents which are registered at an equivalents dictionary;

FIG. 22 shows a specific insertion image to be output when no particular fields of terminology are selected;

FIG. 23 shows a specific word list to be output in the same condition as in FIG. 22;

FIG. 24 shows a specific insertion image to be output when a particular field of terminology, i.e., <Densan (computer)> is selected; and FIG. 25 shows a specific word list to be output in the same condition as in FIG. 24.

DESCRIPTION OF THE PREFERRED EMBODIMENT

Figure 1:
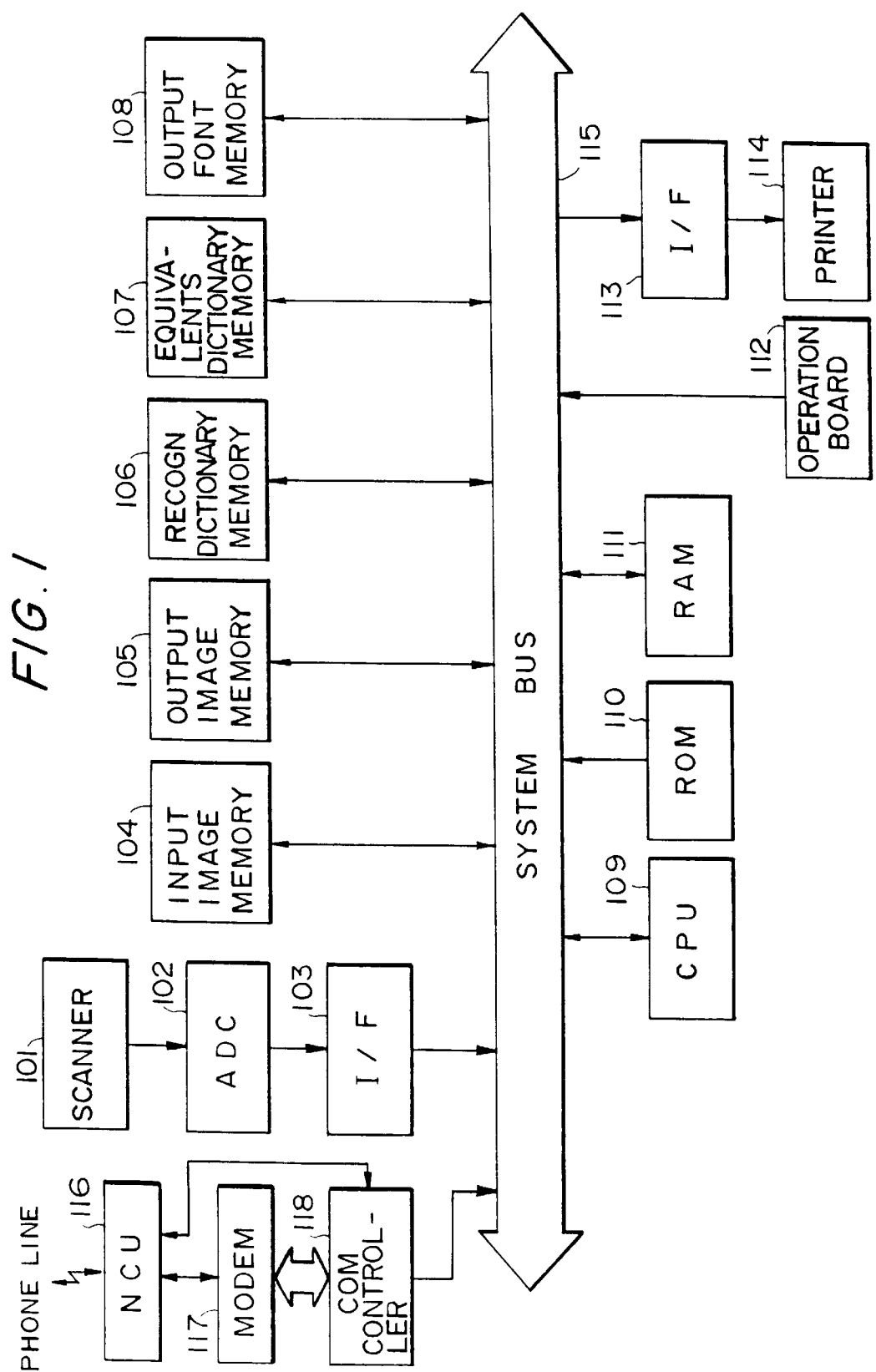
FIG. 1 is a block diagram schematically showing an image forming apparatus with a translation capability embodying the present invention.

An image forming apparatus with a translation capability embodying the present invention will be described under the following headings:

(1) General Construction
(2) Scanner & Printer
(3) CPU
   (3)-(i) Recognizing Document
   (3)-(ii) Composing Paragraphs, Lines & Page
   (3)-(iii) Searching Dictionary for Insertion
   (3)-(iv) Searching Dictionary for Word List I
   (3)-(v) Searching Dictionary for Word List II
   (3)-(vi) Storing Equivalents
   (3)-(vii) Generating Insertion Image
   (3)-(viii) Generating Word List Image (1) General Construction Referring to FIG. 1 of the drawings, the image forming apparatus has a scanner 101 for reading a document image. A CPU (Central Processing Unit) 109 controls the entire apparatus. A ROM (Read Only Memory) 110 stores a control program. The control program accesses a RAM (Random Access Memory) 111, as needed. An input image memory 104 stores the image read by the scanner 101 while an output memory 105 stores an image to be output. A recognition dictionary memory 106 (illustrated in the drawings as recogn dictionary memory) stores data for character recognition. An equivalent dictionary memory 107 stores words and equivalents for them. An output font memory 108 stores character font data for image generation. A system bus 115 allows various constituents of the apparatus to interchange data thereover. An analog-to-digital converter (ADC) 102 converts an analog signal to a corresponding digital signal. An interface (I/F) 103 interfaces the ADC 102 to the system bus 115. A printer 114 is interfaced to the system bus 115 by an I/F 113 for outputting an image stored in the output image memory 105. An operation board 112 is accessible for entering a start command, stop command, etc.

The apparatus additionally has a facsimile communication function. Specifically, an NCU (Network Control Unit) 116 performs various operations for facsimile, e.g., connects and disconnects a telephone line (analog line), sends a dial signal, and detects a ringing frequency. A modem (modulator/demodulator) 117 modulates data to be sent over the telephone line or demodulates data received over the telephone line. A communication controller 118 executes processing prior to the transmission of image data over the telephone line, e.g., recompresses data in conformity to the facsimile function of a destination or reduces the size of image data.

(2) Scanner & Printer

Figure 2:
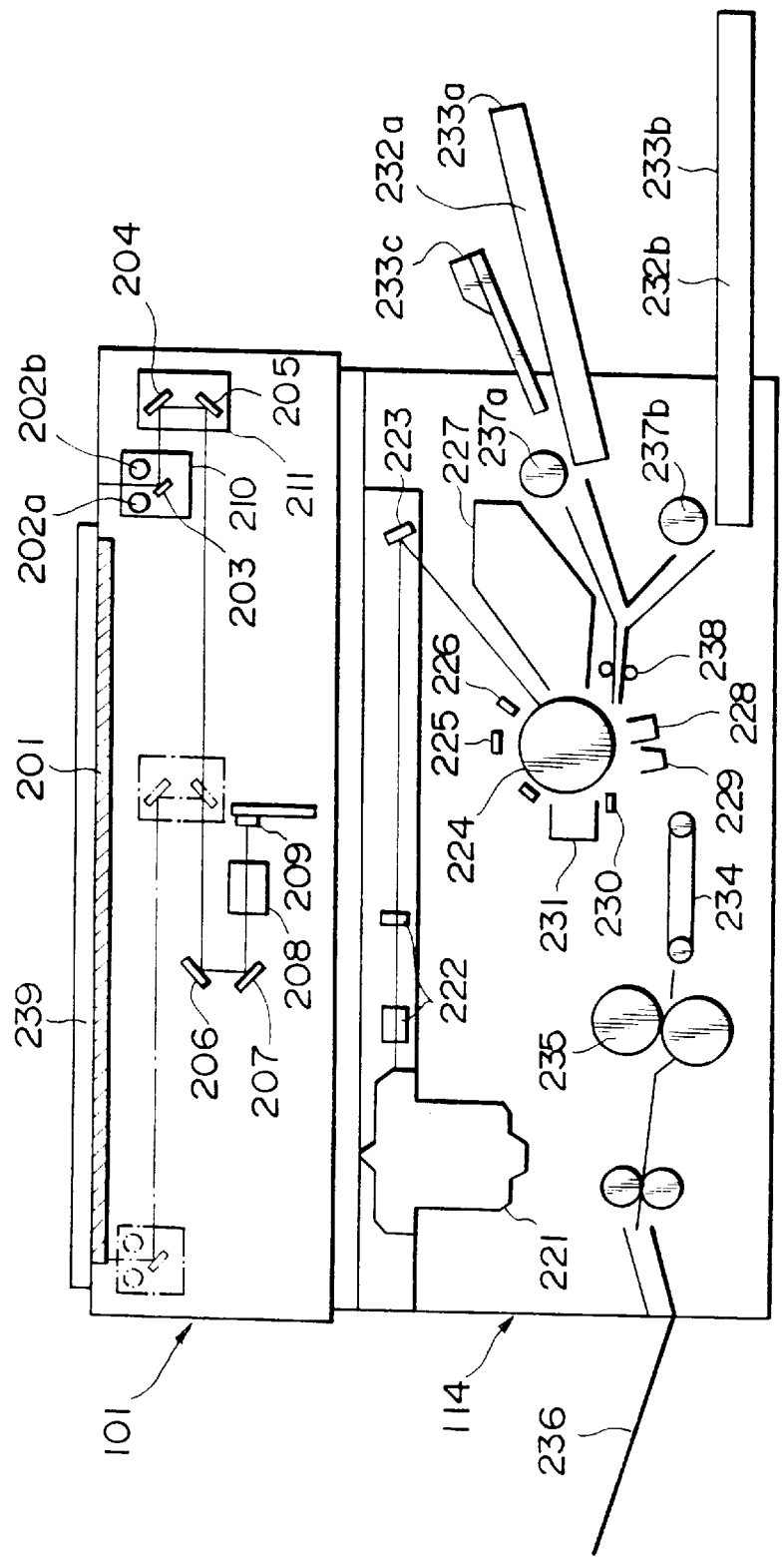
FIG. 2 is a section showing the embodiment.

FIG. 2 shows the scanner 101 and printer 114 specifically. As shown, the scanner 101 has a glass platen 201 on which a document is laid. A light source 202 is made up of two lamps 202a and 202b and illuminates the document on the glass platen 201. The resulting reflection from the document is incident to a CCD (Charge Coupled Device) image sensor 209 via mirrors 203–207 and a lens 208. The light source 202 and mirror 203 are mounted on a carriage 210 which is movable below the glass platen 201 in parallel to the glass platen in the subscanning direction. The mirrors 204 and 205 are mounted on another carriage 211 which is movable in the subscanning direction in association with and at half the speed of the carriage 210. Main scanning is implemented by the solid state scanning of the CCD image sensor 209. As the CCD image sensor 209 reads the document and the optics are movable as mentioned above, the scanner 101 scans the entire document. The reference numeral 239 designates a cover for pressing the document from the above.

The printer 114 is generally made up of a laser writing system, an image reproducing system, and a sheet feeding system. The laser writing system has a laser output unit 221, a group of lenses 222 for convergence, and a mirror 223. The laser output unit 221 has thereinside a laser diode, or laser beam source, and polygon mirror driven by a motor at high speed. A laser beam issuing from the laser writing system is incident to a photoconductive drum 224 included in the image reproducing system. Arranged around the drum 224 are a main charger 225, an eraser 226, a developing unit 227, a transfer charger 228, a separation charger 229, a separator 230, and a cleaning unit 231. A beam sensor, not shown, adjoins one end of the drum 224 within the scanning range of the laser beam in order to generate a main scan synchronizing signal.

An image reproduction procedure particular to the printer 114 will be outlined hereinafter. The main charger 225 uniformly charges the surface of the drum 224 to a high potential. When the laser beam scans the charged surface of the drum 224, the potential of the drum 224 falls in the scanned portion. The laser beam is ON/OFF controlled in accordance with black/white of image data. As a result, a potential distribution, i.e., electrostatic latent image matching the recorded image is formed on the drum 224. When the portion of the drum 224 carrying the latent image is brought to the developing unit 227, the unit 227 deposits a toner on the drum 224 on the basis of the potential distribution, thereby producing a toner image corresponding to the latent image. A sheet 232 (232a or 232b) is fed from a sheet cassette toward the drum 224 at a predetermined timing and superposed on the toner image. The transfer charger 228 transfers the toner image from the drum 224 to the sheet 232. Subsequently, the separation charger 229 and separator 230 cooperate to separate the sheet 232 from the drum 224. Then, the sheet 232 is conveyed by a belt 234 to a fixing roller 235 accommodating a heater therein. After the toner image has been fixed on the sheet 232 by the fixing roller, or heat roller, 235, the sheet 232 is driven out to a tray 236.

As shown in FIG. 2, the printer 114 of the embodiment has two sheet feed lines. One sheet feed line includes an upper cassette 233a and a manual feed tray 233c. A sheet 232a is fed from the cassette 233a or the tray 233c by a pick-up roller 237a. The other sheet feed line includes a lower cassette 233b; a sheet 232b is fed out by a pick-up roller 237b. The sheet 232a or 232b fed by the pick-up roller 237a or 237b is once brought to a stop by a registration roller pair 238 and then driven toward an image transfer position, where the drum 224 is located, in synchronism with the recording process.

(3) CPU

Figure 3B:
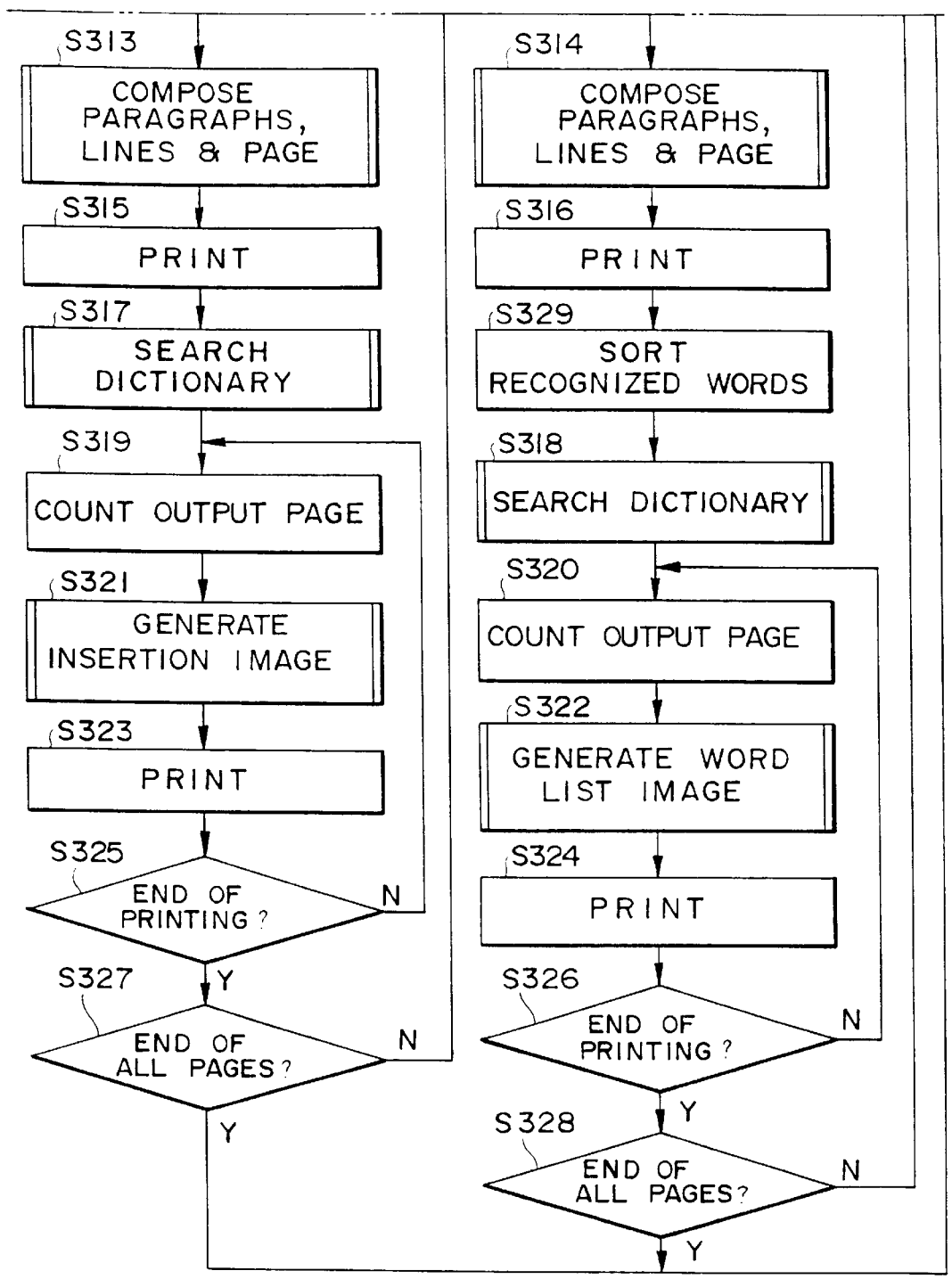
FIG. 3 is a flowchart demonstrating a main routine included in the embodiment.

Referring to FIGS. 3–13, specific operations of the CPU 109 will be described. As shown in FIG. 3, when a power switch provided on the apparatus is turned on, the CPU 109 initializes various modes including a processing mode (step S301). Then, the CPU 109 determines whether or not a translation command has been entered on the operation board 112 (S302). If the answer of the step S302 is NO, the CPU 109 causes the apparatus to perform an ordinary copying operation (S303) and again waits for a translation command (S302). If a translation command has been entered (YES, S302), the CPU 109 determines whether or not priority has been given to any particular field of terminology on the operation board 112 (S350). Specifically, the operation board 112, implemented as a touch panel, displays a list of terminological fields (see FIG. 19) added to the equivalent data of the equivalent dictionary 107, FIG. 1. The operator can select one or more of the terminological fields on the operation board 112, as desired. If priority has not been given to any field (NO, S350), the CPU 109 starts on an ordinary translation procedure matching ordinary writings. Subsequently, the CPU 109 determines the kind of a format command entered on the operation board 112 (S304). If the format command is an insertion command, the CPU 109 determines whether or not a start command has been input on the operation board 112 (S305). On the entry of a start command, the CPU 109 causes the scanner 101 to read the document image (S309) and writes it in the input image memory 104. Thereafter, the CPU 109 counts the page of the document (S309) and executes document recognition (S311).

(3)-(i) Recognizing Document

Figure 4:
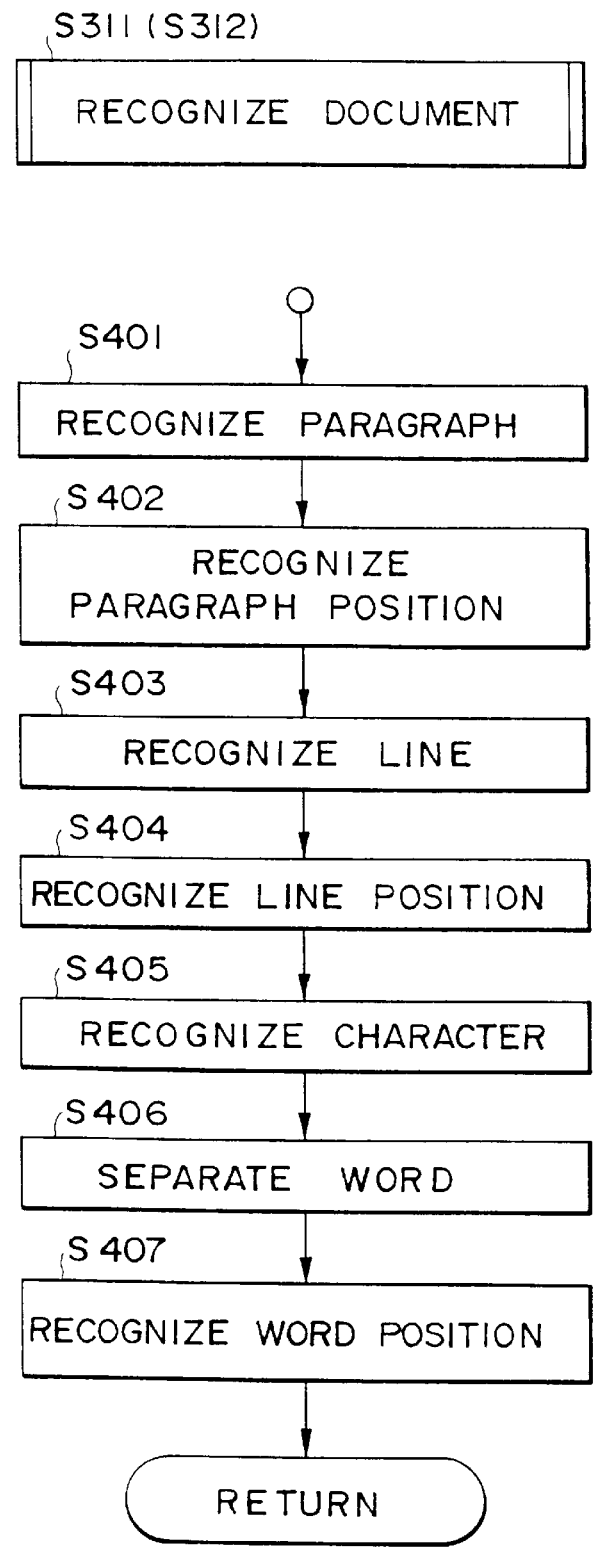
FIG. 4 is a flowchart representative of a document recognizing procedure included in the main routine.
Figure 16:
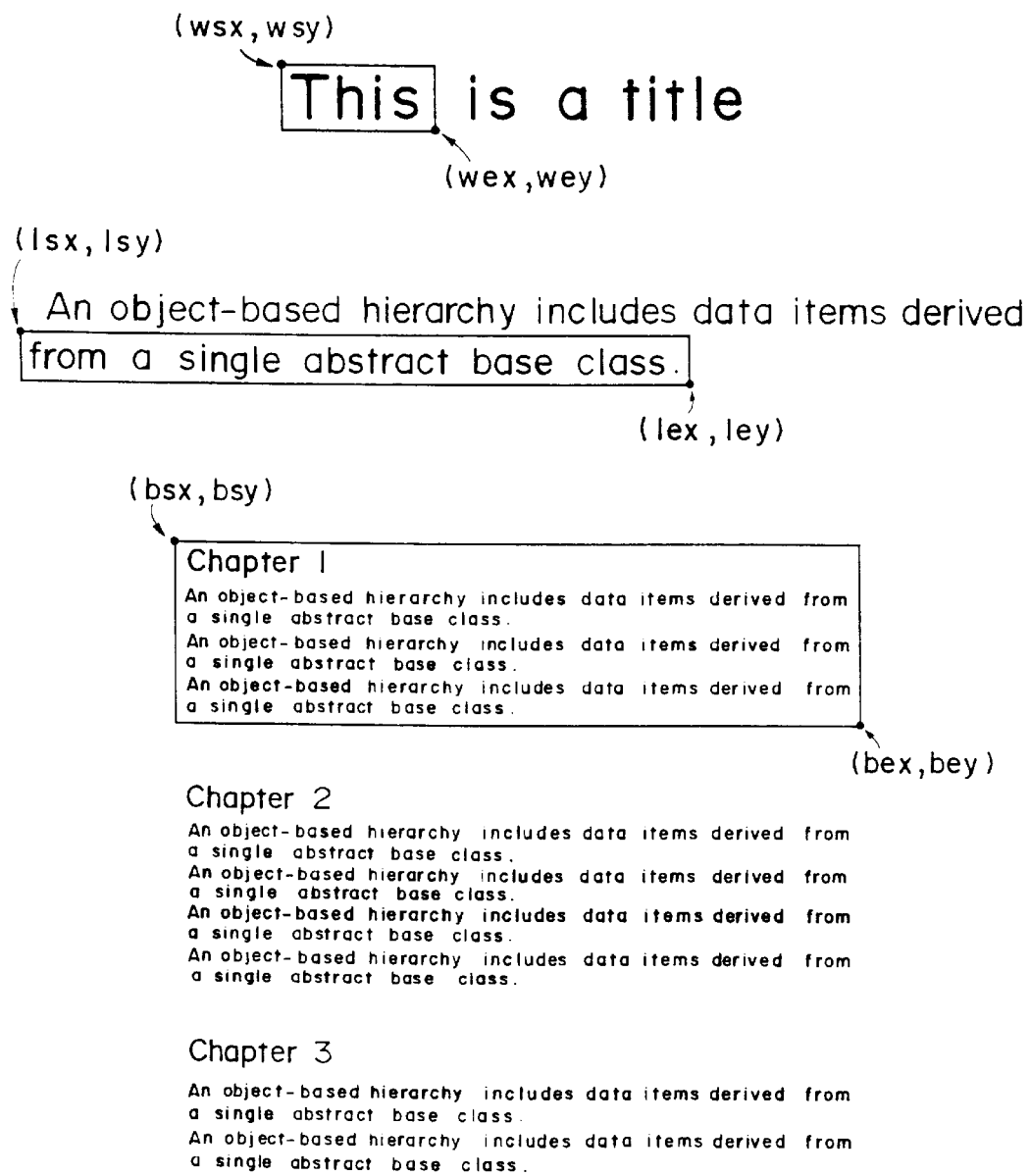
FIG. 16 is a view identical with FIG. 15 except for the addition of coordinates.

FIG. 4 shows the document recognition procedure (S311/S312) specifically. As shown, this procedure begins with a step S401 for recognizing paragraphs. In the step S401, when a blank portion having no character data extends more than a predetermined interval in both the main scanning direction and the subscanning direction, the CPU 109 recognizes it as the border between nearby paragraphs. Subsequently, the CPU 109 recognizes the positions of the paragraph (S402). For this purpose, the CPU gives coordinates, pixel by pixel, to the image data stored in the input image memory 104 and determines the coordinates which the recognized paragraph occupies in the image. FIG. 15 shows a specific document including a paragraph which begins with "Chapter 1". As shown in FIG. 16, the CPU 109 determines the oblong area fully containing, for example, the paragraph beginning with "Chapter 1" and recognizes the top left coordinates (bsx, bsy) and bottom right coordinates (bex, bey) thereof.

The paragraph recognition described above is followed by line recognition (S403). In this step, when a blank portion having no character data extends more than a predetermined interval in the subscanning direction, the CPU 109 recognizes it as the border between adjoining lines. Subsequently, line recognition (S404) is executed. For this purpose, coordinates are given, on a pixel basis, to the image data stored in the input image memory 104, and the coordinates which a recognized line occupy in the image are determined. Taking the line of FIG. 15 which begins with "from a single" as an example, the oblong area fully containing such a line is determined, and the top left coordinates (lsx, lsy) and bottom left coordinates (lex, ley) thereof are determined, as shown in FIG. 16.

After the line recognition (S403), the CPU 109 recognizes characters (S405) by using the combination of conventional technologies, e.g., template matching and topological matching. Subsequently, the CPU 109 separates, on a line basis, words out of the characters recognized in the step S405 (S406). Specifically, when a blank portion having no character data extends more than a predetermined interval in the main scanning direction or when a blank character or a punctuation mark is present, the CPU 109 recognizes it as the end of the border between words. This is followed by word position recognition (S407). In the step S407, coordinates are given, on a pixel basis, to the image data stored in the input image memory 104, and the coordinates which the recognized word occupy in the image are determined. For example, assume the word "This" included in the document of FIG. 15. Then, as shown in FIG. 16, the CPU 109 determines the oblong area fully containing "This" and then recognizes the top left coordinates (wsx, wsy) and bottom right coordinates (wex, wey) thereof.

(3)-(ii) Composing Paragraphs, Lines & Page

Figure 5:
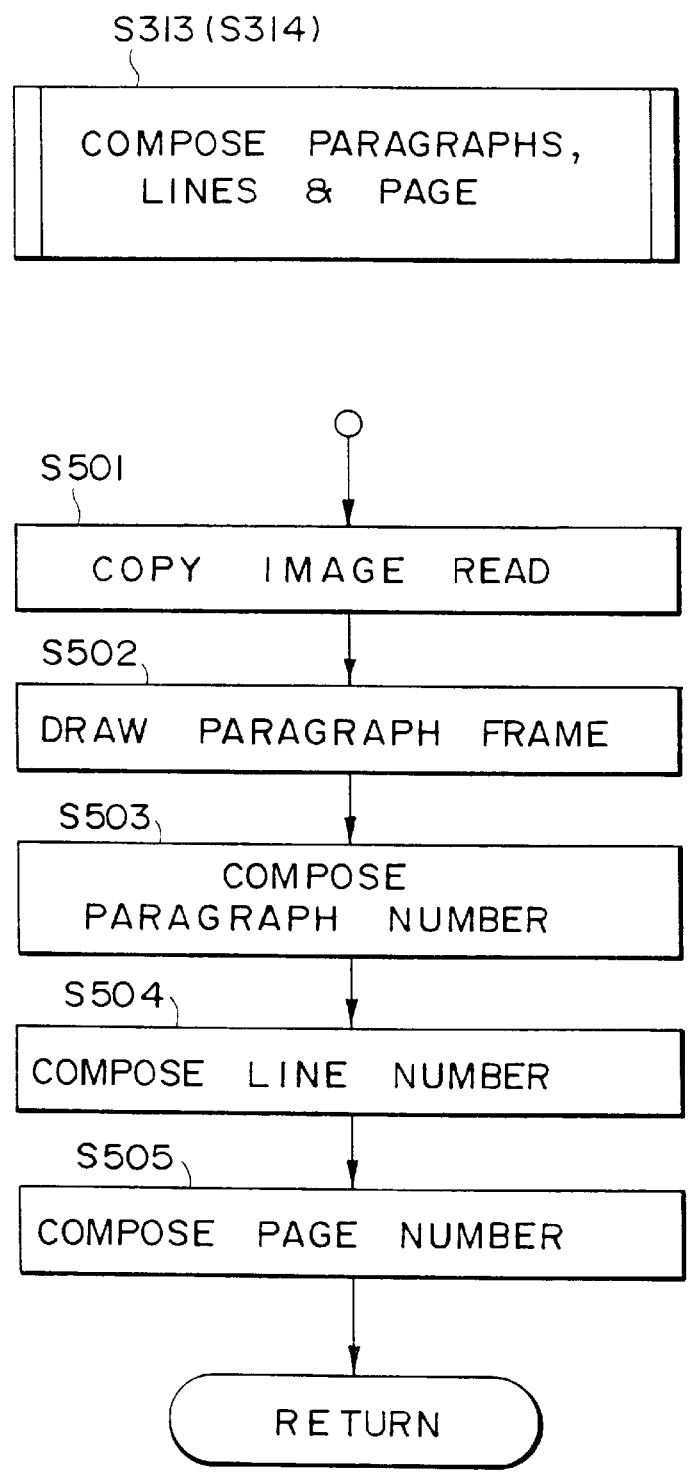
FIG. 5 is a flowchart representative of a paragraphs, lines and page composing procedure also included in the main routine.

Referring again to FIG. 3, the paragraphs, lines and page are combined (S313/S314) in the event of insertion processing and word list processing. Such a procedure is shown in FIG. 5 specifically. To begin with, the CPU 109 copies the image data read by the scanner 101 and stored in the input image memory 104 in the output image memory 105 (S501).

Subsequently, the CPU 109 draws oblongs each fully containing one of the paragraphs on the basis of the coordinates data determined in the step S402 (S502). Specifically, the CPU 109 draws for each paragraph an oblong having the coordinates (bsx, bsy) and (bex, bey) which are diagonal to each other. FIG. 17 shows such frames corresponding to the paragraphs of FIG. 15.

Thereafter, the CPU 109 adds serial paragraph numbers to the top lefts of the paragraphs recognized in the step S401 (S503). For this purpose, the CPU 109 reads font data for the serial numbers out of the output font memory 108 and writes them in the output image memory 105. At this instant, the CPU 109 uses the coordinates (bsx, bsy) as a reference, i.e., starts writing the font data in the memory 105 at (bsx, bsy). FIG. 17 shows specific paragraph numbers drawn by the CPU 109.

The paragraph number composition (S503) is followed by line number composition (S504). In this step, the CPU 109 adds serial line numbers, on a paragraph basis, to the right ends of the lines recognized in the step 403. For this purpose, the CPU 109 reads font data for line numbers out of the output font memory 108 and writes them in the output image memory 105, using the coordinates (lsx, lsy) as a reference. Specifically, the CPU 109 starts writing them in the memory 105 at (lsx, lsy). Specific line numbers drawn by the CPU 109 are shown in FIG. 17. In this case, the line numbers to be output are limited to the multiples of "5".

After the step S504, the CPU 109 composes a page number (S505). Specifically, the CPU 109 adds the page number determined in the step S306 to the bottom center of the image stored in the output image memory 105. For this purpose, the CPU 109 reads font data for a page number out of the output font memory 108 and writes them in the output image memory 105, using the coordinates of the bottom center of the document stored in the output image memory 105 as a reference. A specific page number generated by the CPU 109 is shown in FIG. 17.

By the above sequence of steps, image data with paragraph numbers, line numbers and page number are composed in the output image memory 105. The resulting image is printed by the printer 114 (S315/S316; see FIG. 3). Subsequently, for the word list processing, the CPU 109 sorts the recognized words (S329).

(3)-(iii) Searching Dictionary for Insertion

Figure 6B:
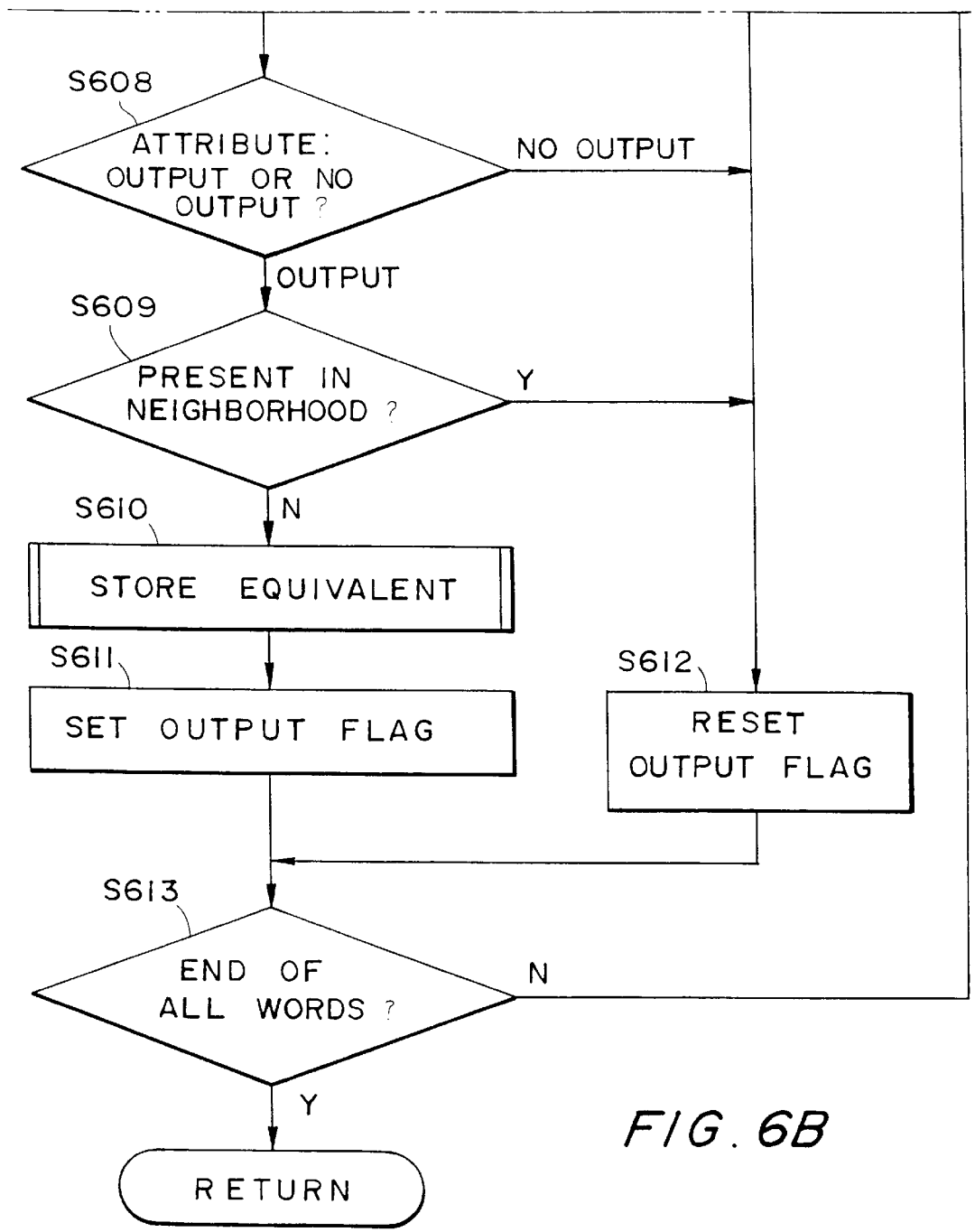
FIG. 6 is a flowchart representative of an equivalents dictionary searching procedure (insertion) also included in the main routine.

The equivalents dictionary is looked up for insertion, as follows (S317). As shown in FIG. 6, the CPU 109 reads one of the words separated by the procedure of FIG. 4 and stored (S601). Then, the CPU 109 determines whether or not the word has a flection (S602 and S603). If the word has a flection (YES, S603), the CPU 109 determines the part of speech of the word (S604). For example, if the flection is the addition of "s", the CPU 109 determines that the word is a noun having a plural form; if it is the addition of "ed", the CPU determines that the word is a verb having a past tense. Further, when the word has a flection, the CPU 109 determines the original form thereof (S605).

After the step S605, the CPU 109 searches the equivalents dictionary memory 107 with, basically, the pattern matching algorithm (S606). The memory 107 stores words and equivalents for them in pairs as well as output distributes on a word basis. The CPU 109 compares the word read in the step 601 with the words stored in the memory 107 character by character to see if the former exactly matches any one of the latter (S607). If all the characters of the word read in the step S601 match the characters of a word stored in the memory 107, the CPU 109 determines that an expected word is present in the dictionary. Then, the CPU 109 examines the output attribute of the word (S608). The words "output attribute" is an attribute indicating whether or not the equivalent for the word of interest should be actually output. For example, for simple words which do not have to be translated, an attribute "No output" is added and stored in the memory 107.

When the word of interest should be output as determined in the step S608, the CPU 109 determines whether or not the word has already appeared in the neighborhood of the current line and has the equivalent therefor registered (S609). Specifically, the CPU 109 compares, on a character basis, words corresponding to equivalents stored in a step S610 with the word being searched for, thereby determining whether or not a matching word exists. If such a word exists, the word being searched for exists in the vicinity of the current line; if otherwise, it does not exists. The CPU 109 sets an output flag for the word whose equivalent has been stored (S611). On the other hand, for the word which does not exist in the memory 107 (No, S607), the word whose attribute is "No output" (NO OUTPUT, S 608), and the word already appeared (YES, S609), the CPU 109 resets the output flag (S612). The CPU 109 repeats this procedure with all the separated words (S613).

(3)-(iv) Searching Dictionary for Word List I

Figure 7B:
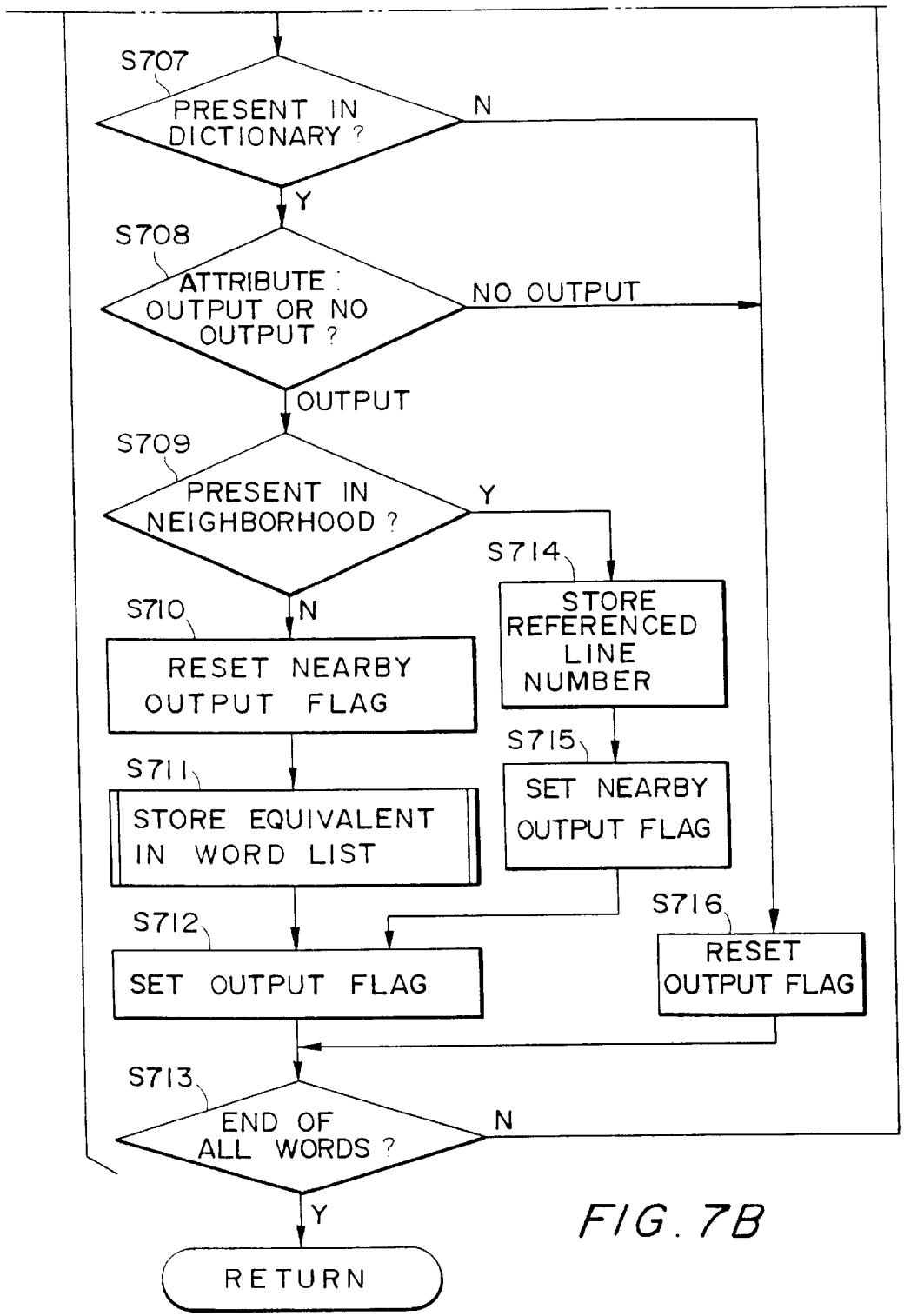
FIG. 7 is a flowchart representative of an equivalents dictionary searching procedure (word list) also included in the main routine.

The CPU 109 looks up the equivalents dictionary for generating a word list, as follows (S318). Specifically, as shown in FIG. 7, the CPU 109 reads one of the words separated in the step S406, FIG. 4, and determines whether or not the word has a flection (S702 and S703). If the word has a flection (YES, S703), the CPU 109 determines the part of speech of the word (S704). For example, if the flection is the addition of "s", the CPU 109 determines that the word is a noun having a plural form; if it is the addition of "ed", the CPU determines that the word is a verb having a past tense. Further, when the word has a flection, the CPU 109 determines the original form thereof (S705).

After the step S705, the CPU 109 searches the equivalents dictionary memory 107 with, basically, the pattern matching algorithm (S706). The memory 107 stores words and equivalents for them in pairs as well as output distributes on a word basis. The CPU 109 compares the word read in the step 701 with the words stored in the memory 107 character by character to see if the former exactly matches any one of the latter (S707). If all the characters of the word read in the step S701 match the characters of a word stored in the memory 107, the CPU 109 determines that an expected word is present in the dictionary. Then, the CPU 109 examines the output attribute of the word (S708). Again, the words "output attribute" refer to an attribute indicating whether or not the equivalent for the word of interest should be actually output.

When the word of interest should be output as determined in the step S708, the CPU 109 determines whether or not the word has already appeared in the neighborhood of the current line and has the equivalent therefor registered (S709). Specifically, the CPU 109 compares, on a character basis, words corresponding to equivalents stored in a step S711 with the word being searched for, thereby determining whether or not a matching word exists. If such a word exists, the word being searched for exists in the vicinity of the current line; if otherwise, it does not exists. When the answer of the step S709 is YES, the CPU 109 stores the referenced line number (S714) and sets a nearby output flag (S715). On the other hand, if the word of interest does not exist in the neighborhood, the CPU 109 resets the nearby output flag (S710) and then executes word list equivalent store processing (S711). Thereafter, the CPU 109 sets an output flag for the word whose equivalent has been stored (S712). For the word which does not exist in the dictionary (NO, step S707) and the word whose attribute is "No output" (NO OUTPUT, S 708), the CPU 109 resets the output flag (S716). The CPU 109 repeats this procedure with all the separated words (S713).

(3)-(v) Searching Dictionary for Word List II

Figure 8A:
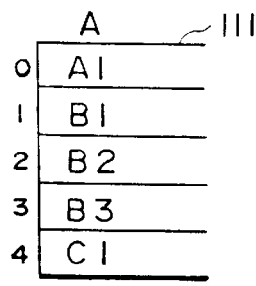
FIGS. 8A and 8B are flowcharts similar to FIG. 7.
Figure 8B:
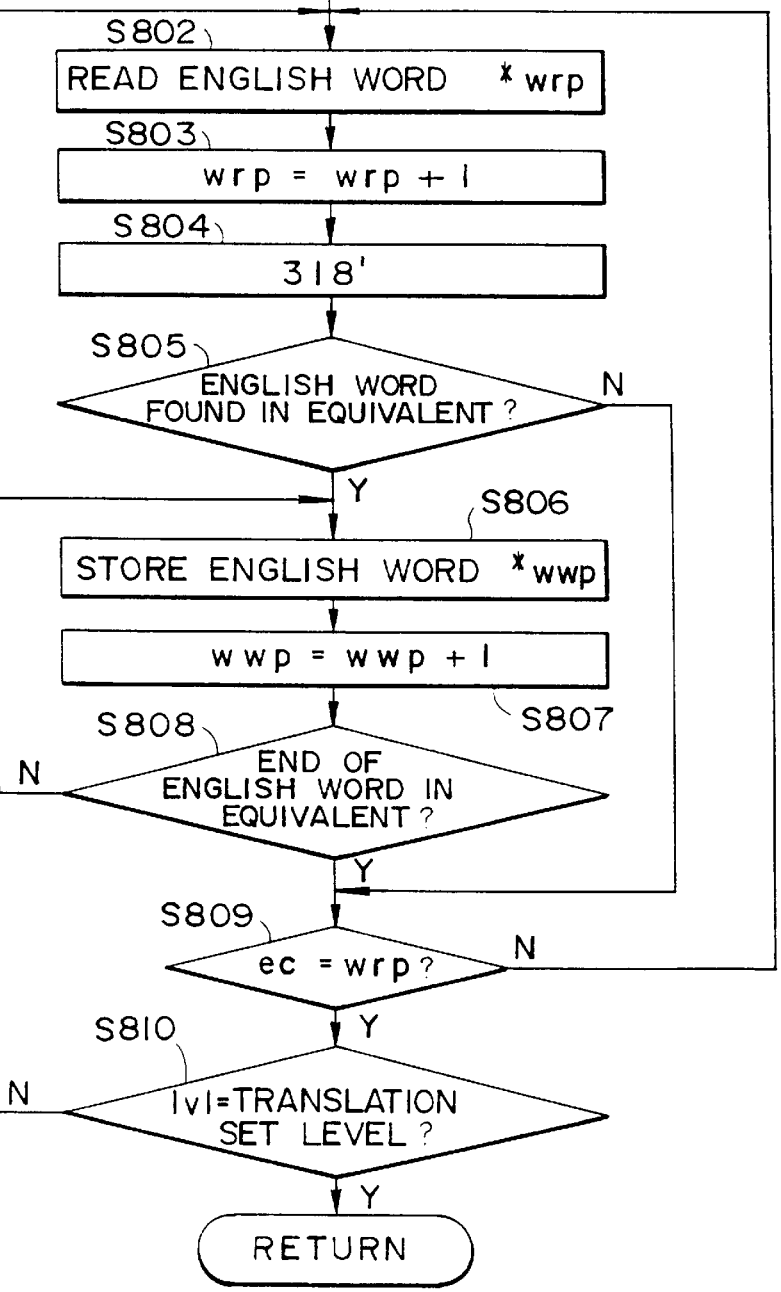

FIG. 8A shows the contents of the RAM 111; numerals 0 to 4 at the left-hand side indicate addresses while A1, B1, B2 and C1 at the right-hand side indicate data respectively associated with the addresses 0–4. FIG. 8B is representative of equivalent dictionary search processing to be executed when the equivalents include words in English. In FIG. 8B, labeled |v|, wrp, wwp and ec are a re-search level, a word read pointer, a word write pointer, and an end code, respectively.

To begin with, the CPU 109 sets conditions |v|=1, wrp=0, wwp=1, and ec=1 (S801), executes English word reading (S802), and then increments wrp by 1 (one) (S803). Subsequently, the CPU 109 executes a sequence of steps collectively indicated by S318' in FIG. 7 (S804), and determines whether or not an English word has been detected in the equivalents (S805). If the answer of the step S805 is YES, the CPU 109 stores the English word and increments wwp by 1 (step S807). Then, the CPU 109 determines whether or not all the English words in the equivalents have ended (S808); if the answer is NO, the program returns to the step S806. This is repeated until all the English words end. Conversely, if the answer of the step S808 is YES, the CPU 109 determines whether or not ec=wrp is satisfied (S809). If ec is not equal to wrp, the CPU 802 returns to the step 802 and repeats this procedure until ec=wrp holds. On determining that ec is equal to wrp, the CPU 109 determines whether or not |v| has reached a translation set level (S810). If the answer of the step S810 is NO, the CPU 109 increments |v| by 1 (S811), sets up a condition ec=wwp (S812), returns to the step 802, and repeats such a procedure until |v| reaches the translation set level. If the answer of the step S810 is YES, the program simply returns. When an ordinary mode which does not output equivalents of original form is selected, "1" should only be set in the step S810.

A more specific procedure particular to the embodiment will be described hereinafter. The procedure to be described looks up the dictionary and, if the equivalents include an equivalent of original form, again searches the dictionary as to the original form before outputting.

First, in the equivalents of original form searched again, the first equivalents of the parts of speech decided on the basis of a change are output, as shown below specifically (English-to-Japanese by way of example):

| Input word: | gone | Index word: | gone | Equivalent: | iku |
| Input word: | feed | Index word: | feed | Equivalent: | fito |

Second in the equivalents of original form searched again, the equivalents of the parts of speech decided on the basis of a change are inserted in the equivalent of the index English word found first, and then all the equivalents are output, as shown below specifically:

| Input word: | gone | Index word: | gone |
| Equivalent: | [Do ] go no kakobunshi [iku, unko shiteiru] [Kei]sugisatta, mikominonai |
| Input word: | feet | Index word: | feet |
| Equivalent: | [Mei]fito (nagasanotanni), footnofukusukei] |

For the above examples, the equivalent dictionary memory 107 is assumed to store the following:

go: [Do] iku, unko shiteiru [Mei] iku, (saru) koto, seiryoku gone: [Do] go no kakobunshi [kei] sugisatta, mikomi no nai foot: [Mei] hashi, (yama no) fumoto, foot no fukusukei feet: [Mei] fito (nagasa no tanni), foot no fukusukei In the illustrative embodiment, when the equivalents of a single word refer to a plurality of other words, the search is repeated up to three words.

(3)-(vi) Storing Equivalents

Figure 9:
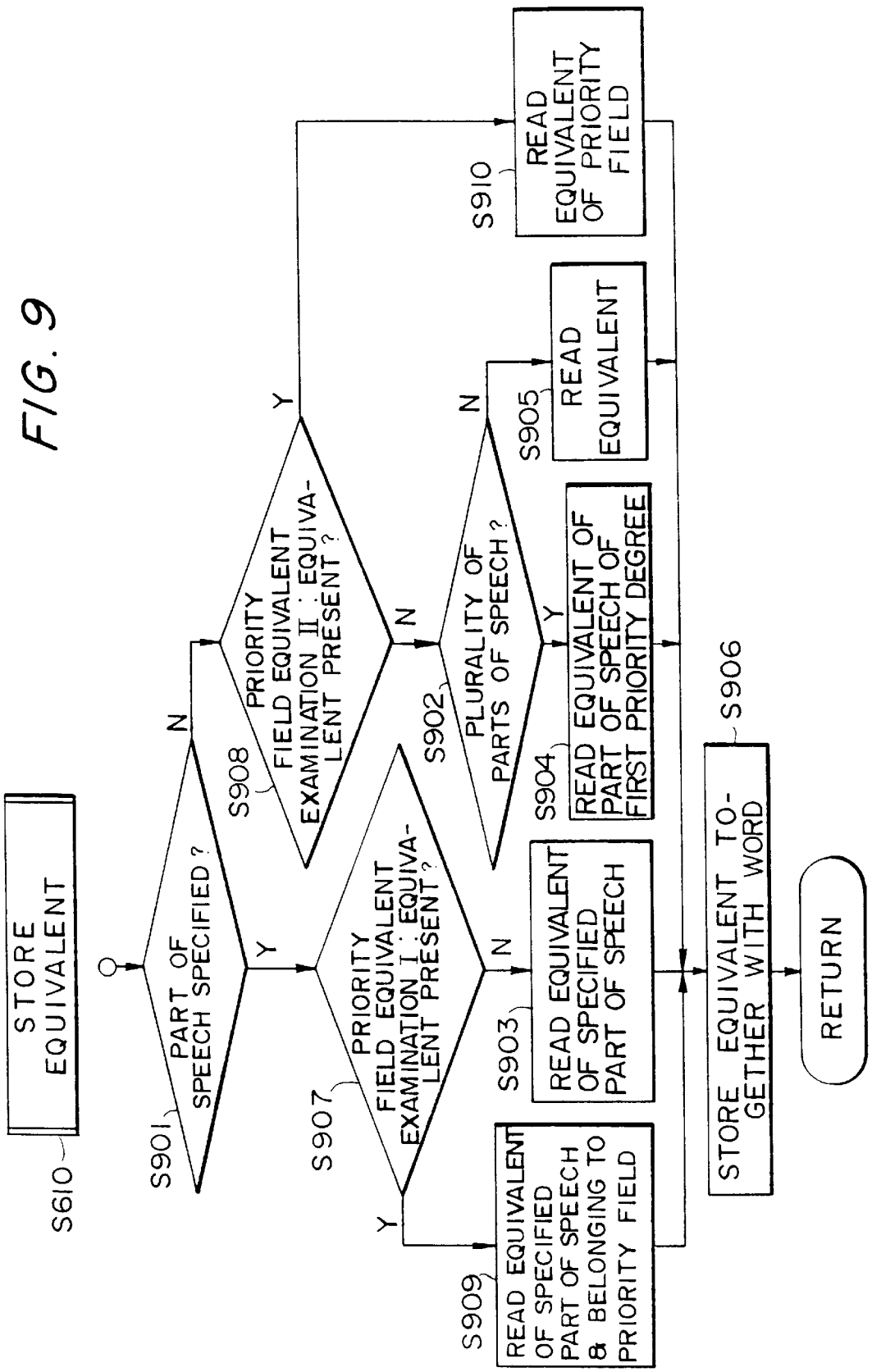
FIG. 9 is a flowchart representative of an equivalents storing procedure (insertion image) included in FIG. 6.

Storage of equivalents (S610) included in the routine of FIG. 6 will be described specifically with reference to FIG. 9. The CPU 109 reads a word and its equivalent out of the equivalents dictionary memory 107 and stores them. While the memory 107 stores words and their equivalents in pairs, a plurality of equivalents are registered at the memory 107 for each word. A particular priority order is given to the associated equivalents on the basis of the part of speech.

Subsequently, the CPU 109 determines whether or not the part of speech has been identified in the step S604, FIG. 6, (S901). If it has been identified, the CPU 109 determines whether or not priority has been given to a particular field of terminology on the operation board 112 or whether or not the equivalents of the designated part of speech do not include desired one (S907; PRIORITY FIELD EQUIVALENT EXAMINATION I). If the answer of the step S907 is NO, the CPU 109 reads the equivalents of the designated part of speech, as usual (S903). If the answer of the step S907 is YES, the CPU 109 reads the equivalent to which priority has been given (S909). Conversely, when the part of speech is not specified (NO, S901), the CPU 109 executes PRIORITY FIELD EQUIVALENT EXAMINATION II (S908). If no priority fields have been entered (NO, S908) or if the equivalents of the word do not include one belonging to the priority field (NO, S908), the CPU 109 determines whether or not the equivalents include a plurality of parts of speech, as usual (S902). If the answer of the step S902 is YES, the CPU 109 read out one equivalent of the part of speech having the first priority degree (S904). If the answer of the step S902 is NO, the CPU 109 reads out the equivalents (S905). If the answer of the step S908 is YES, the CPU 109 reads the equivalent belonging to the priority field (S910). Assume that a plurality of priority fields have been selected on the operation board 112, and that the equivalents of a single word include ones belonging to the designated fields. Then, the CPU 109 gives priority to the equivalent belonging to the priority field designated first (S909 and S910).

The word "play", for example, is stored in the equivalent dictionary memory 107 in the following format:

play [Do] asobu; $_{18}$ suru; enso suru [Mei] asobi

The above format shows that the first degree of priority is given to [Do (verb)] which includes "asobu", $_{18}$ suru", and "enso suru", and that the second degree of priority is given to [Mei (noun)] which is "asobi". Hence, when the part of speech is determined to be a verb, "asobu" will be read out; when it is a noun, "asobi" will be read out. Further, the part of speech is not specified, "asobu" having the first degree of priority will be read out. Such an equivalent or equivalents are stored together with the word (S906). The word "supervisor", for example, is one of the words belonging to particular terminological fields. "Supervisor" is stored in the equivalent dictionary memory 107 in the following format:

| supervisor | [Mei] kantokusha <Densan> supabaiza (OS o koseisuru sofutouea no uchi, sono chukakububun to shite kinosuru mojuru o sasu.) |

Therefore, when the priority field <Densan (computer)> is selected on the operation board 112, the equivalent "supabaiza (supervisor)" belonging to the priority field is selected, whether the part of speech has been identified or not. This equivalent is stored together with the word. When the field <Densan> is not selected, the priority equivalent "kantokusha (a person who supervises)" is read out and stored together with the word.

A reference will be made to FIG. 10 for describing how the equivalents are stored in a word list (S711, FIG. 7). To begin with, the CPU 109 determines whether or not a part of speech has been specified in the step 704, FIG. 7, (S1001). If the answer of the step S1001 is YES, the CPU 109 executes a step S1009 (PRIORITY FIELD EQUIVALENT EXAMINATION I) to see if the equivalents of the specified part of speech include one belonging to the priority field. If the answer of the step S1009 is NO, the CPU 109 read only the equivalents of the specified part of speech, as usual (S1003). If the answer of the step S1009 is YES, the CPU 109 read out the equivalent belonging to the priority field (S1011), and also reads out the other equivalents of the specified part of speech (S1012). Conversely, when the part of speech is not specified, the CPU 109 executes a step S1010 (PRIORITY FIELD EQUIVALENT EXAMINATION II) to see if the equivalents of the word include one belonging to the designated priority field. If the answer of the step S1010 is NO, the CPU 109 determines whether or not the equivalents include a plurality of parts of speech, as usual (S1002). If the answer of the step S1002 is YES, the CPU 109 reads out the equivalent of the part of speech having the first degree of priority (S1004); if otherwise, the CPU 109 reads out the equivalents (S1005). On the other hand, if the answer of the step S1010 is YES, the CPU 109 reads out the equivalent of interest (S1013), and then reads the other equivalents (S1014).

After reading out the equivalent of the specified part of speech in the step S1003 or S1012, the CPU 109 read out the equivalents of the other parts of speech (S1006). Likewise, after reading the equivalent of the part of speech having the first degree of priority in the step S1004, the CPU 109 reads out the equivalents of the other parts of speech (S1007). Thereafter, the CPU 109 stores such equivalents together with the word (S1008).

The word "supervisor", for example is read out by the following procedure: [In memory 107]

| supervisor | [Mei] kantokusha <Densan> supabaiza os o koseisuru sofutouea no uchi, sono chukakububun to shite kinosuru mojuru o sasu.) |
|---|---|

[Output word list (when <Densan> is not selected)

| supervisor | [Mei] kantokusha <Densan> supabaiza (OS o koseisuru sofutouea no uchi, sono chukakububun to shite kinosuru mojuru o sasu.) |
|---|---|

[Output word list (when <Densan> is selected)

| supervisor | <Densan> supabaiza (OS o koseisuru sofutouea no uchi, sono chukakububun to shite kinosuru mojuru o sasu.); [Mei] kantokusha |
|---|---|

Referring again to FIG. 3, the CPU 109 counts pages to be output (S319/S320). In accordance with the present invention, the image generated and output by the image generating means has a greater amount of data than the document image read by the scanner. Hence, it may occur that a single document image results in a plurality of pages of output images. The CPU 109 counts the pages of such output images in the steps S319 and S320.

(3)-(vii) Generating Insertion Image

Figure 11B:
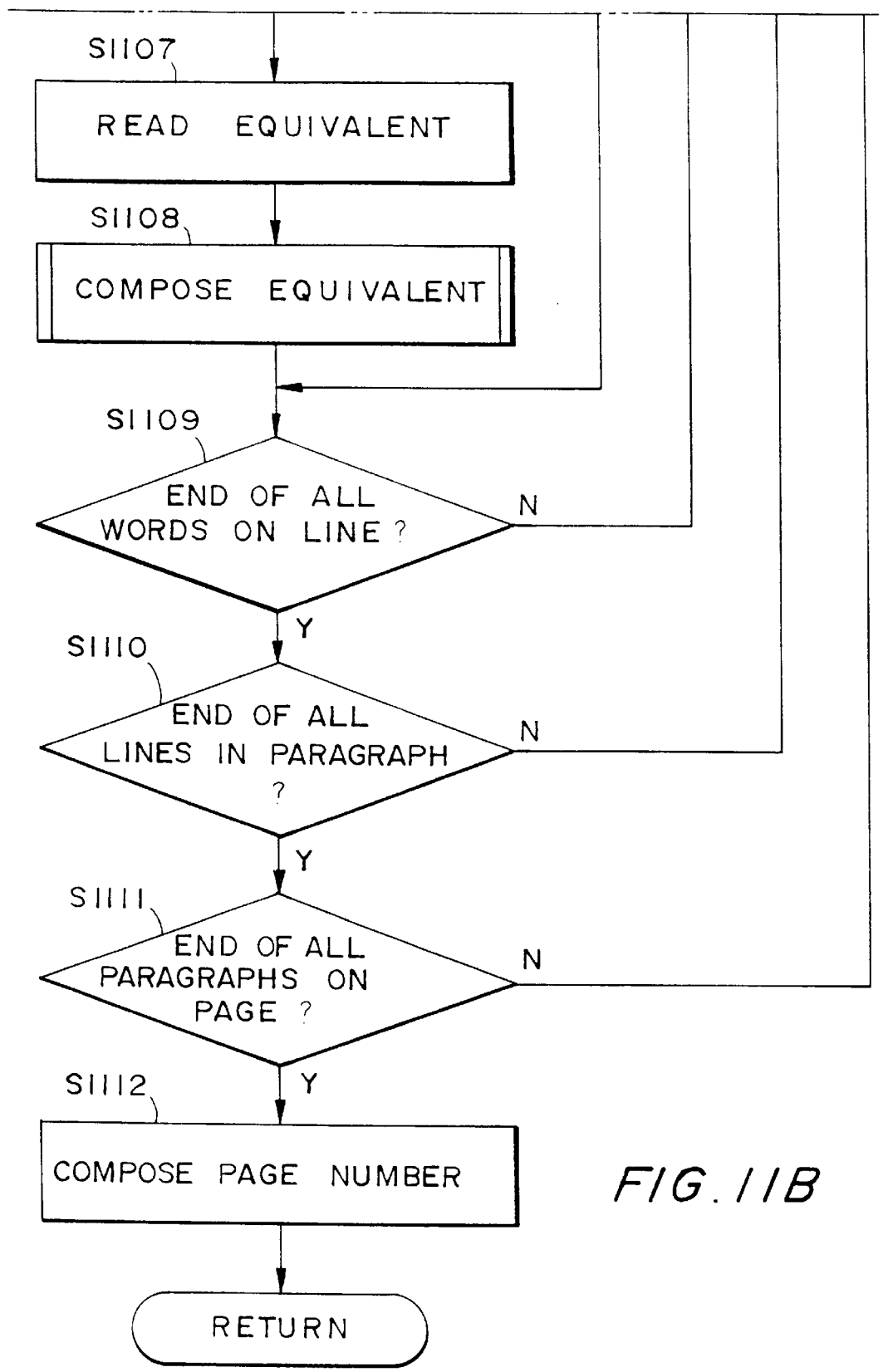
FIG. 11 is a flowchart representative of an insertion image generating procedure included in the main routine.

How an insertion image is generated (S321, FIG. 3) will be described with reference to FIG. 11. To begin with, the CPU 109 sequentially counts the paragraphs recognized in the step S401, FIG. 4, (S1101). Subsequently, the CPU 109 reads font data matching the paragraph numbers out of the output font memory 108 and then writes them in the output image memory 105, thereby composing paragraph numbers (S1102). FIG. 18 shows specific paragraph numbers composed by such a procedure.

After the step S1102, the CPU 109 sequentially counts the lines recognized in the step S403, FIG. 4, (S1103). Then, the CPU 109 reads font data matching the count numbers out of the output font memory 108 and writes them in the output image memory 105 so as to compose line numbers (S1104). Thereafter, the CPU 109 copies in the output image memory 105 the oblong areas produced from the image data stored in the input image memory 104 and each having the diagonal coordinates determined in the step S404 (S1105). Specific line numbers produced by this procedure are also shown in FIG. 18; the line numbers are assumed to be the multiples of "5".

Subsequently, the CPU 109 determines whether or not the output flag has been set in the step S611 or S612, FIG. 6, word by word. For the words for which the output flag has been set, the CPU 109 reads the equivalents stored in the step 610, FIG. 6, (S1107), and then composes equivalents by reading font data matching the equivalents read out of the output font memory 108 and writing them in the output image memory 105 (S1108). At this instant, the CPU 109 calculates the reference position in the memory 105 on the basis of the position of the word corresponding to the equivalent. As a result, equivalents are each output under the respective word, for which the output flag has been set, while being centered with respect to the word.

The CPU 109 determines whether or not the processing has completed the last word on the line (S1109). If the answer of the step S1109 is NO, the CPU 109 repeats the above-stated step S1106 and successive steps with the next word. When the answer of the steps 1109 turns out YES, the CPU 109 determines whether or not all the lines in the paragraph have been processed (S1110). If the answer of the step S1110 is NO, the CPU 109 repeats the step 1103 and successive steps with the next line. When all the lines in the paragraph have been processed, the CPU 109 determines whether or not all the paragraphs of the page have been processed (S1111); if the answer is NO, the CPU 109 repeats the step 1101 and successive steps with the next paragraph. Thereafter, the CPU 109 composes a page number (S1112), as in the previously stated step 505, FIG. 5.

(3)-(viii) Generating Word List Image

Figure 12B:
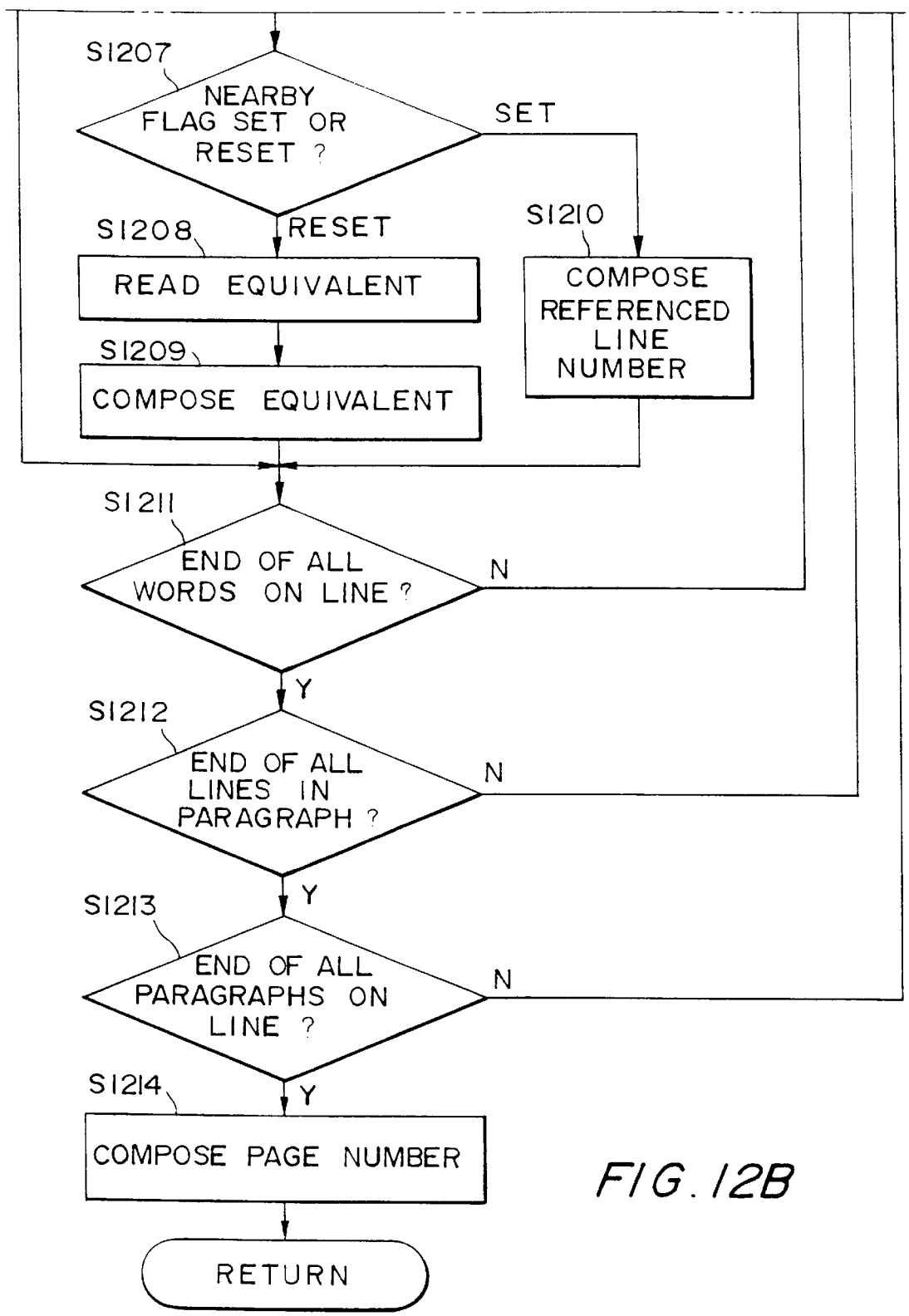
FIG. 12 is a flowchart representative of a word list image generating procedure also included in the main routine.

How a word list image is generated (S322, FIG. 3) will be described with reference to FIG. 12. To begin with, the CPU 109 sequentially counts the paragraphs recognized in the step S401, FIG. 4, (S1201). Subsequently, the CPU 109 reads font data matching the paragraph numbers out of the output font memory 108 and then writes them in the output image memory 105, thereby composing paragraph numbers (S1202).

After the step S1202, the CPU 109 sequentially counts the lines recognized in the step S403, FIG. 4, (S1203). Then, the CPU 109 reads font data matching the count numbers out of the output font memory 108 and writes them in the output image memory 105 so as to compose line numbers (S1204). Subsequently, the CPU 109 determines whether or not the output flag has been set (S1205). If the output flag has been set, the CPU 109 composes an English word (S1206) and then examines nearby flags (S1207). If the output flag has been reset, the CPU 109 reads equivalents (S1208) and then composes them (S1209). Conversely, if any nearby flag has been set, the CPU 109 composes the referenced line number (S1210).

After the step S1209 or S1210 or if the answer of the step S1205 is RESET, the CPU 109 determines whether or not the processing has completed to the last word on the line (S1211). If the answer of the step S1209 is NO, the CPU 109 repeats the above-stated step S1205 and successive steps with the next word. When the answer of the steps 1211 turns out YES, the CPU 109 determines whether or not all the lines in the paragraph have been processed (S1212). If the answer of the step S1212 is NO, the CPU 109 repeats the step 1203 and successive steps with the next line. When all the lines in the paragraph have been processed, the CPU 109 determines whether or not all the paragraphs of the page have been processed (S1213); if the answer is NO, the CPU 109 repeats the step 1201 and successive steps with the next paragraph. Thereafter, the CPU 109 composes a page number, as in the step S505, FIG. 5. In this case, the CPU 109 generates the page number of the document and that of the generated image which are connected by a hyphen, as shown in FIG. 18 specifically.

Referring again to FIG. 3, the above procedure is followed by a step S323 or S324 for printing the image, as in the step S315 or S316. Specifically, the insertion image generated by the step S321 is printed by the printer 114. Then, the CPU 109 determines whether or not the entire insertion image corresponding to the document has been fully printed (S325). If the answer of the step S325 is NO, the CPU 109 returns to the step S319 and counts the next page. If the answer of the step 325 is YES, the CPU 109 determines whether or not all the documents have been read and undergone the above processing (S327). If the answer of the step S327 is NO, the CPU 109 repeats the step S307 and successive steps with the next document. On completing the steps described, the CPU 109 returns to the step S302.

Assume that a plurality of words are connected by a particular symbol to constitute a single word. When such a combined word is not found in the previously stated equivalents storing means, the CPU 109 separates it into the individual or constituent words and then outputs equivalents for each word to thereby compose a word list. This will be described with reference to FIG. 13 specifically. To begin with, an English word including a particular symbol, e.g., "-", "&" or "/" is searched for, as follows. The CPU 109 looks up the equivalents dictionary memory 107 to search for the word including the symbol. If such a word is not found in the memory 107, the CPU 109 divides it at the symbol and again looks up the memory 107 in order to find the individual words. Examples are shown below:

| Input word: | electron-spin | | |
|---|---|---|---|
| Index word 1: | electron | Equivalent 1: | denshi |
| Index word 2: | spin | Equivalent 2: | tsumugu |

In another mode,

| Input word: | electron-spin |
|---|---|
| Index word 1: | erekutoron |
| Equivalent 1: | [Mei] denshi, erekutoron |
| Index word 2: | spin |
| Equivalent 2: | [Do] tsumugu, (ito o) kakeru, mawasu, supin suru |

For the above examples, the equivalents dictionary memory 107 is assumed to store the following contents:

| electron | [Mei] denshi, erekutoron |
|---|---|
| spin | [Do] tsumugu, (ito o) kakeru, mawasu, supin suru |

Figure 13:
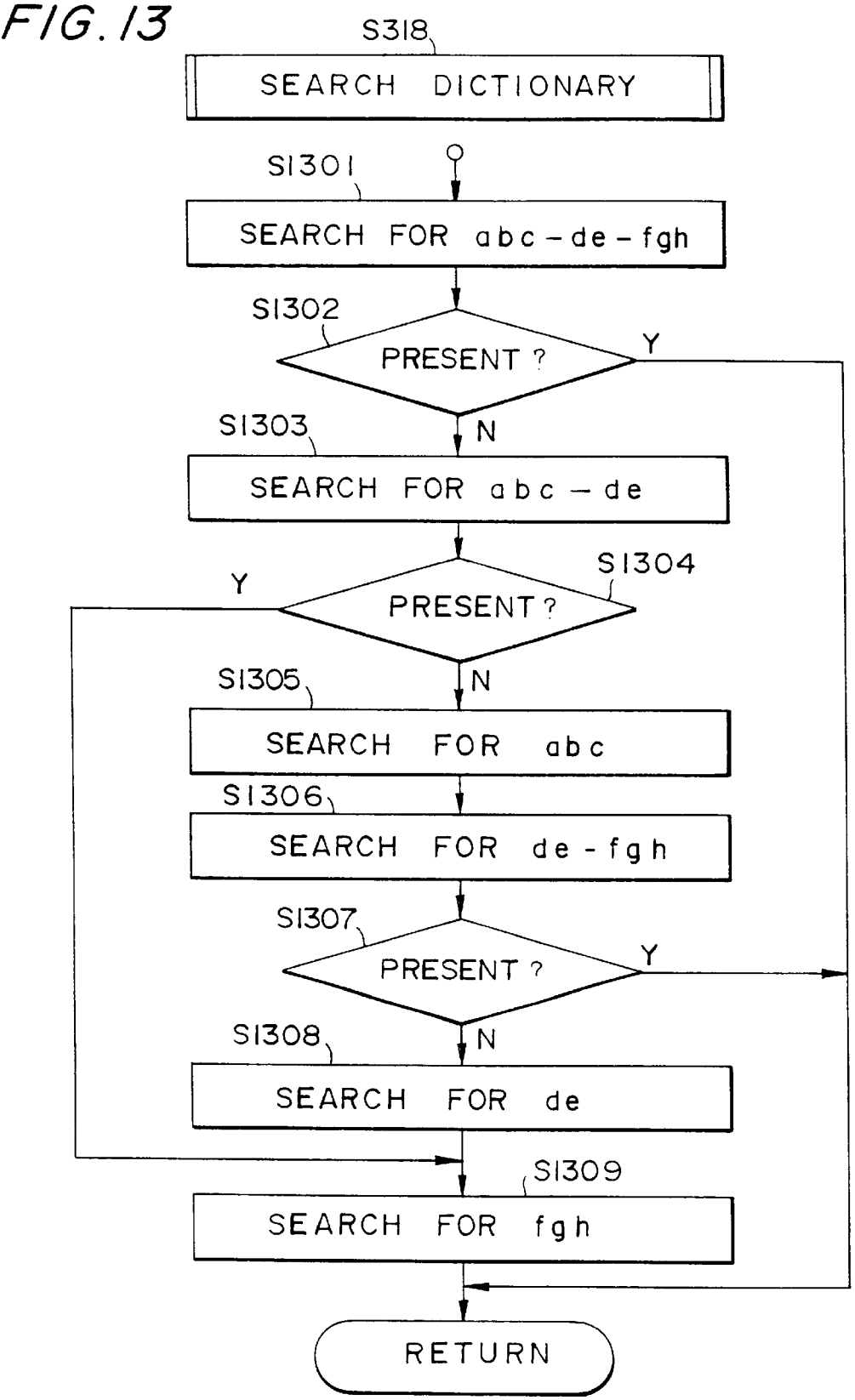
FIG. 13 is a flowchart representative of an alternative equivalents dictionary searching procedure (word list) included in the main routine.

Referring to FIG. 13, assume a composite word with hyphens "abc-de-fgh" by way of example. As shown, the CPU 109 looks up the equivalent dictionary memory 107 for the equivalents for "abc-de-fgh" (S1301 and S1302). If the equivalents are present in the memory 107, the CPU 109 returns and executes the above processing. If the answer of the step S1301 is NO, the CPU 109 searches for the equivalents of "abc-de" (S1303 and S1304). If the answer of the step S1304 is YES, the CPU 109 searches for the equivalents of "fgh" (S1309). If the answer of the step S1304 is NO, the CPU 109 searches for the equivalents for "abc" (S1305). Next, the CPU 109 searches for the equivalents for "de-fgh" (S1306 and S1307). If the answer of the step S1307 is YES, the program returns; if otherwise, the CPU 109 searches for the equivalents for "de" (S1308 and S1309).

FIG. 14 shows a specific word list output by the above processing while FIG. 19 lists specific fields of terminology. FIG. 20 shows a specific document written in English. FIG. 21 shows an arrangement of index words and equivalents thereof which are stored in the equivalents dictionary memory 107. By comparing FIG. 22 (insertion image) and FIG. 23 (word list image), it will be seen that when no terminological fields are selected on the operation board 112, the head words and equivalents thereof are simply output in an arrangement different from the that of FIG. 21 due to the part-of-speech examination (see the word "variable").

Assume that the operator has selected the field <Densan (computer)>. Then, the insertion image and the word list image appear as shown in FIGS. 24 and 25, respectively. As shown, the equivalents of the word "supervisor" and those of the word "editor" are each rearranged to render a writing relating to the computer art readable. Although the word "process" also includes an equivalent headed by "Densan", it is determined to be a noun by the part-of-speech examination; the CPU 109 determines that the writing does not include equivalents belonging to the <Densan> field.

While the illustrative embodiment implements the various kinds of control over the image forming apparatus with software, the software may be replaced with hardware (either entirely or partly) to promote high speed processing.

In summary, the present invention provides an image forming apparatus with a translation capability having various unprecedented advantages, as enumerated below.

(1) The apparatus recognizes words included in document image data, distinguishes words whose equivalents should be output from the other words, and generates a word list listing the words whose equivalents should be output and the equivalents.

(2) The apparatus limits each of the number of output characters and/or the number of output lines of the word list to a predetermined number.

(3) When equivalent data read out of the document image data further includes a word, the apparatus can again search for the equivalents for that word.

(4) The apparatus limits the number of times that such re-search control can be repeated.

(5) The apparatus can select either a re-search mode for outputting the equivalents of a word or an ordinary mode for not outputting them.

(6) The apparatus can control the output order of the words and their equivalents of the word list on the basis of the output order of words or the alphabetical order of words of document image data.

(7) The apparatus prevents the same word and equivalents thereof from repeatedly appearing on the same page of the word list.

(8) When a word consists of a plurality of words connected by particular symbols and it does not exist in equivalents storing means, the apparatus separates at least one of the individual words, outputs the equivalents for the separated word, and then generates a word list. This allows equivalents for words existing in a document image to be collected in a word list, thereby providing a person with a sufficient amount of data. As a result, a writing in a foreign language is readable efficiently and rapidly.

(9) The apparatus allows a desired field of terminology to be entered thereon and, therefore, renders a writing belonging to a particular or special field as readable as ordinary documents.

Various modifications will become possible for those skilled in the art after receiving the teachings of the present disclosure without departing from the scope thereof.

What is claimed is:

1. A method of translating using a machine, comprising the steps of:

inputting a word of a document to be translated;

determining whether the word is to be translated by examining an attribute of the word, the attribute being stored in a memory;

translating the word, only when the determining step determines, by examining the attribute, the word is to be translated; and storing the word which has been translated, said method further comprising the step of:

indicating a category to which the document belongs, wherein the step of translating comprises translating the word using one of a plurality of translations which corresponds to said category.

2. A method of translating using a machine, comprising the steps of:

inputting a word of a document to be translated;

determining whether the word is to be translated;

translating the word, only when the determining step determines the word is to be translated;

storing the word which has been translated; and generating a list of translated words including the word to be translated for only a portion of words which exist in the document, said method further comprising the step of:

indicating a category to which the document belongs, wherein the step of translating comprises translating the word using one of a plurality of translations which corresponds to said category.

3. A machine translation system, comprising:

means for inputting a word of a document to be translated;

means for determining whether the word is to be translated by examining an attribute of the word, the attribute being stored in a memory;

means for translating the word, only when the determining step determines, by examining the attribute, the word is to be translated; and a memory for storing the word which has been translated, said system further comprising:

means for indicating a category to which the document belongs, wherein the means for translating comprises means for translating the word using one of a plurality of translations which corresponds to said category.

4. A machine translation system, comprising:

means for inputting a word of a document to be translated;

means for determining whether the word is to be translated;

means for translating the word, only when the determining step determines the word is to be translated;

means for storing the word which has been translated; and means for generating a list of translated words including the word to be translated for only a portion of words which exist in the document, said system further comprising:

means for indicating a category to which the document belongs, wherein the means for translating comprises means for translating the word using one of a plurality of translations which corresponds to said category.

* * * * *